US012710705B2

(12) United States Patent
Mizukoshi et al.

(10) Patent No.: US 12,710,705 B2
(45) Date of Patent: Aug. 18, 2026

(54) IMAGE FORMING APPARATUS

(71) Applicant: CANON KABUSHIKI KAISHA, Tokyo (JP)

(72) Inventors: Shunsuke Mizukoshi, Tokyo (JP); Hiroki Sasame, Tokyo (JP); Tomoo Akizuki, Kanagawa (JP); Yusuke Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/812,461

(22) Filed: Aug. 22, 2024

(65) Prior Publication Data

US 2025/0068092 A1 Feb. 27, 2025

(30) Foreign Application Priority Data

Aug. 23, 2023 (JP) ................................ 2023-135939

(51) Int. Cl.
*G03G 15/02* (2006.01)
*G03G 15/043* (2006.01)
(Continued)

(52) U.S. Cl.
CPC ..... *G03G 15/0266* (2013.01); *G03G 15/0233* (2013.01); *G03G 15/043* (2013.01);
(Continued)

(58) Field of Classification Search
CPC ............... G03G 21/08; G03G 21/0064; G03G 15/0216–0266; G03G 15/065; G03G 15/1675
See application file for complete search history.

(56) References Cited

U.S. PATENT DOCUMENTS 5,697,013 A * 12/1997 Sasaki .................. G03G 15/065 399/150
5,970,279 A * 10/1999 Sakaizawa ......... G03G 21/0064 399/46
(Continued)

FOREIGN PATENT DOCUMENTS

JP 2005-345915 A 12/2005
JP 2009-192941 A 8/2009
(Continued)

OTHER PUBLICATIONS

Machine Translation of JP 2019-053181. Apr. 4, 2019. (Year: 2019).*
(Continued)

*Primary Examiner* — Carla J Therrien
(74) *Attorney, Agent, or Firm* — Venable LLP

(57) ABSTRACT

An image forming apparatus includes a photosensitive member, a charging member, a charging voltage applying portion, an exposure unit, a developing member, a developing voltage applying portion, a transfer member, a transfer voltage applying portion, and a controller. In a discharging operation, an exposure surface is formed on a photosensitive member surface by exposing the photosensitive member surface to light by the exposure unit. The controller carries out control so that a developing voltage on a side of a predetermined polarity relative to an exposure surface potential is applied to the developing member; a transfer voltage less than a discharge start voltage in absolute value of a potential difference between itself and the exposure surface potential is applied to the transfer portion; and a charging voltage on the side of the predetermined polarity relative to the exposure surface potential is applied to the charging member.

15 Claims, 7 Drawing Sheets

(51) Int. Cl.

| | |
|---|---|
| ***G03G 15/06*** | (2006.01) |
| ***G03G 15/16*** | (2006.01) |
| ***G03G 21/00*** | (2006.01) |
| ***G03G 21/08*** | (2006.01) |

(52) U.S. Cl.
CPC ....... *G03G 15/065* (2013.01); *G03G 15/1675* (2013.01); *G03G 21/0064* (2013.01); *G03G 21/08* (2013.01); *G03G 2215/025* (2013.01)

(56) References Cited

U.S. PATENT DOCUMENTS

| | | | | |
|---|---|---|---|---|
| 11,099,496 | B2 | 8/2021 | Kobayashi et al. | |
| 11,435,675 | B2 | 9/2022 | Kanal et al. | |
| 2003/0118362 | A1* | 6/2003 | Akita | G03G 13/09 399/129 |
| 2016/0274481 | A1* | 9/2016 | Kawanabe | G03G 15/043 |
| 2018/0307162 | A1 | 10/2018 | Kobayashi et al. | |
| 2023/0095217 | A1 | 3/2023 | Minagawa et al. | |
| 2023/0288857 | A1 | 9/2023 | Akizuki et al. | |
| 2024/0168405 | A1 | 5/2024 | Shimizu et al. | |
| 2024/0302765 | A1 | 9/2024 | Sakamoto et al. | |
| 2024/0377777 | A1 | 11/2024 | Akizuki et al. | |

FOREIGN PATENT DOCUMENTS

| | | | |
|---|---|---|---|
| JP | 2019053181 | A * | 4/2019 |
| JP | 2020-139986 | A | 9/2020 |
| JP | 2020-160361 | A | 10/2020 |
| JP | 2023-044587 | A | 3/2023 |
| JP | 2023-113258 | A | 8/2023 |

OTHER PUBLICATIONS

Extended European Search Report dated May 20, 2025, in European Patent Application No. 24195564.0.

* cited by examiner

IMAGE FORMING APPARATUS

FIELD OF THE INVENTION AND RELATED ART

The present invention relates to an image forming apparatus, such as a printer, a copying machine, or a facsimile machine, of an electrophotographic type or an electrostatic recording type.

Conventionally, for example, the image forming apparatus such as the printer of the electrophotographic type, a surface of a photosensitive member is electrically charged uniformly by a charging device, and the charged surface of the photosensitive member is exposed to light by an exposure device, so that an electrostatic latent image is formed on the surface of the photosensitive member. Then, the electrostatic latent image formed on the surface of the photosensitive member is developed by being supplied with toner as a developer by a developing device.

An image forming apparatus of a contact charging type in which a rotatable charging roller is contacted to a photosensitive drum and then a surface of the photosensitive drum is charged by applying a charging bias to a core metal of the charging roller has been widely used. The contact charging type has an advantage such that a degree of electric discharge is small and abrasion of a surface layer (resin layer) of the photosensitive drum can be suppressed.

Further, to a surface of the toner, fine particles (external additive) such as silicon oxide are added in advance, so that flowability of the toner is improved, and thus improvement in circulation of the toner in a developing device has been widely made, for example.

However, particularly, in the surface charging type, in the case where this external additive is excessively deposited on a surface of the charging roller, an image defect due to improper charging occurs in some instances. On the other hand, a constitution in which deposition of the toner, deposited on the surface of the photosensitive drum, onto the surface of the charging roller can be suppressed by discharging the surface of the photosensitive drum before the photosensitive drum surface is charged by the charging roller is disclosed in Japanese Laid-Open Patent Application (JP-A) 2009-192941.

Further, in recent years, in progress of downsizing of the image forming apparatus, a development separation-less constitution has been widely employed. That is, in the image forming apparatus of the contact development type in which a developing roller as a developer carrying member device in the developing device is contacted to a photosensitive drum and then development is carried out, a contact and separation mechanism by which the developing roller is contacted to and separated from the photosensitive drum is provided in some instances. The development separation-less constitution refers to a constitution in which this contact and separation mechanism is not provided and in which the developing roller and the photosensitive drum are substantially always in contact with each other. Further, in this development separation-less constitution, when rotation of the photosensitive drum is started, a developing bias of a polarity opposite to a normal charge polarity of the toner is applied to the developing roller, so that a fog during startup can be alleviated. This is disclosed in JP-A 2005-345915. In order to suppress the fog during the startup, an appropriate developing bias is set on the assumption of the case where a predetermined time has elapsed from the last image forming operation and a surface potential of the photosensitive drum causes dark decay. Or, JP-A 2020-160361 discloses a constitution in which when the image forming operation is ended, the surface of the photosensitive drum is discharged. By this, an appropriate developing bias can be set during the startup without causing a large change in surface potential of the photosensitive drum during the startup due to a difference in elapsed time from the last image forming operation, so that the fog during the startup can be suppressed.

Incidentally, in order to discharge the surface of the photosensitive drum sufficiently, a length of time of a discharging operation may desirably be set so as to become not less than a time in which the photosensitive drum rotates one full circumference. Further, in general, when the surface of the photosensitive drum passes through a charging portion, a charging bias is not applied to the charging roller.

However, in this case, a potential difference between the surface potential of the photosensitive drum and the charging bias becomes small, so that deposition of the external additive or the like onto the surface of the charging roller cannot be suppressed. By this, an image defect due to improper charging occurs in some cases.

SUMMARY OF THE INVENTION

Therefore, a principal object of the present invention is to suppress image inconveniences due to deposition of the external additive or the like onto a charging member due to a post-step of an image forming operation.

This object has been accomplished by an image forming apparatus according to the present invention.

According to an aspect of the present invention, there is provided an image forming apparatus comprising: a rotatable photosensitive member; a charging member configured to form a charging portion in contact with the photosensitive member and configured to electrically charge a surface of the photosensitive member which rotates; a charging voltage applying portion configured to apply a charging voltage to the charging member; an exposure unit configured to form an electrostatic latent image on the surface of the photosensitive member by exposing, to light, the surface of the photosensitive member charged by the charging member; a developing member configured to form a developing portion in contact with the photosensitive member and configured to form a developer image on the surface of the photosensitive member by supplying a developer, charged to a predetermined polarity, to the electrostatic latent image in the developing portion; a developing voltage applying portion configured to apply a developing voltage to the developing member; a transfer member configured to form a transfer portion in contact with the photosensitive member; a transfer voltage applying portion configured to apply a transfer voltage to the transfer portion; and a controller configured to control the charging voltage applying portion, the developing voltage applying portion, the transfer voltage applying portion, and the exposure unit, wherein rotation of the photosensitive member is stopped in a state in which the developing member contacts the photosensitive member after image formation in which the developer image is transferred from the photosensitive member onto a developer image receiving member in the transfer portion, wherein the controller carries out control so as to execute a discharging operation for electrically discharging the surface of the photosensitive member before the rotation of the photosensitive member is stopped after the image formation, and wherein in the discharging operation, an exposure surface is formed on the surface of the photosensitive member by exposing the surface of the photosensitive member to light by the exposure unit, and the controller carries out control so that: during passing of the exposure surface through the developing portion, to the developing member, the developing voltage on a side of the predetermined polarity relative to a potential of the exposure surface is applied, during passing of the exposure surface through the transfer portion, to the transfer portion, the transfer voltage less than a discharge start voltage in absolute value of a potential difference between itself and the potential of the exposure surface is applied, and during passing of the exposure surface through the charging portion, to the charging member, the charging voltage on the side of the predetermined polarity relative to the potential of the exposure surface is applied.

According to another aspect of the present invention, there is provided an image forming apparatus comprising: a rotatable photosensitive member; a charging member configured to form a charging portion in contact with the photosensitive member and configured to electrically charge a surface of the photosensitive member which rotates; a charging voltage applying portion configured to apply a charging voltage to the charging member; an exposure unit configured to form an electrostatic latent image on the surface of the photosensitive member by exposing, to light, the surface of the photosensitive member charged by the charging member; a developing member configured to form a developing portion in contact with the photosensitive member and configured to form a developer image on the surface of the photosensitive member by supplying a developer, charged to a predetermined polarity, to the electrostatic latent image in the developing portion; a developing voltage applying portion configured to apply a developing voltage to the developing member; a transfer member configured to form a transfer portion in contact with the photosensitive member; a transfer voltage applying portion configured to apply a transfer voltage to the transfer portion; a cleaning member provided in contact with the photosensitive member and configured to remove the developer from the photosensitive member; and a controller configured to control the charging voltage applying portion, the developing voltage applying portion, the transfer voltage applying portion, and the exposure unit, wherein rotation of the photosensitive member is stopped in a state in which the developing member contacts the photosensitive member after image formation in which the developer image is transferred from the photosensitive member onto a developer image receiving member in the transfer portion, wherein the controller carries out control so as to execute a discharging operation for electrically discharging the surface of the photosensitive member before the rotation of the photosensitive member is stopped after the image formation, and wherein in the discharging operation, an exposure surface is formed on the surface of the photosensitive member by exposing the surface of the photosensitive member to light by the exposure unit, and the controller carries out control so that: during passing of the exposure surface through the developing portion, to the developing member, the developing voltage on a side of the predetermined polarity relative to a potential of the exposure surface is applied, during passing of the exposure surface through the transfer portion, to the transfer portion, the transfer voltage is applied, during passing of the exposure surface through the charging portion, to the charging member, the charging voltage on the side of the predetermined polarity relative to the potential of the exposure surface is applied, and the transfer voltage applied to the transfer portion during the passing of the exposure surface through the transfer portion is on a side opposite to the predetermined polarity relative to the charging voltage applied to the charging member during the passing of the exposure surface through the charging portion.

According to a further aspect of the present invention, there is provided an image forming apparatus comprising: a rotatable photosensitive member; a charging member configured to form a charging portion in contact with the photosensitive member and configured to electrically charge a surface of the photosensitive member which rotates; a charging voltage applying portion configured to apply a charging voltage to the charging member; an exposure unit configured to form an electrostatic latent image on the surface of the photosensitive member by exposing, to light, the surface of the photosensitive member charged by the charging member; a developing member configured to form a developing portion in contact with the photosensitive member and configured to form a developer image on the surface of the photosensitive member by supplying a developer, charged to a predetermined polarity, to the electrostatic latent image in the developing portion; a contact and separation mechanism configured to contact the developing member to the photosensitive member and to separate the developing member from the photosensitive member; a transfer member configured to form a transfer portion in contact with the photosensitive member; a transfer voltage applying portion configured to apply a transfer voltage to the transfer portion; a cleaning member provided in contact with the photosensitive member and configured to remove the developer from the photosensitive member; and a controller configured to control the charging voltage applying portion, the transfer voltage applying portion, and the exposure unit, wherein rotation of the photosensitive member is stopped in a state in which the developing member is separated from the photosensitive member by the contact and separation mechanism after image formation in which the developer image is transferred from the photosensitive member onto a developer image receiving member in the transfer portion, wherein the controller carries out control so as to execute a discharging operation for electrically discharging the surface of the photosensitive member before the rotation of the photosensitive member is stopped after the image formation, and wherein in the discharging operation, an exposure surface is formed on the surface of the photosensitive member by exposing the surface of the photosensitive member to light by the exposure unit, and the controller carries out control so that: during passing of the exposure surface through the transfer portion, to the transfer portion, the transfer voltage is applied, during passing of the exposure surface through the charging portion, to the charging member, the charging voltage on the side of the predetermined polarity relative to the potential of the exposure surface is applied, and the transfer voltage applied to the transfer portion during the passing of the exposure surface through the transfer portion is on a side opposite to the predetermined polarity relative to the charging voltage applied to the charging member during the passing of the exposure surface through the charging portion.

Further features of the present invention will become apparent from the following description of exemplary embodiments with reference to the attached drawings.

Figure 7:
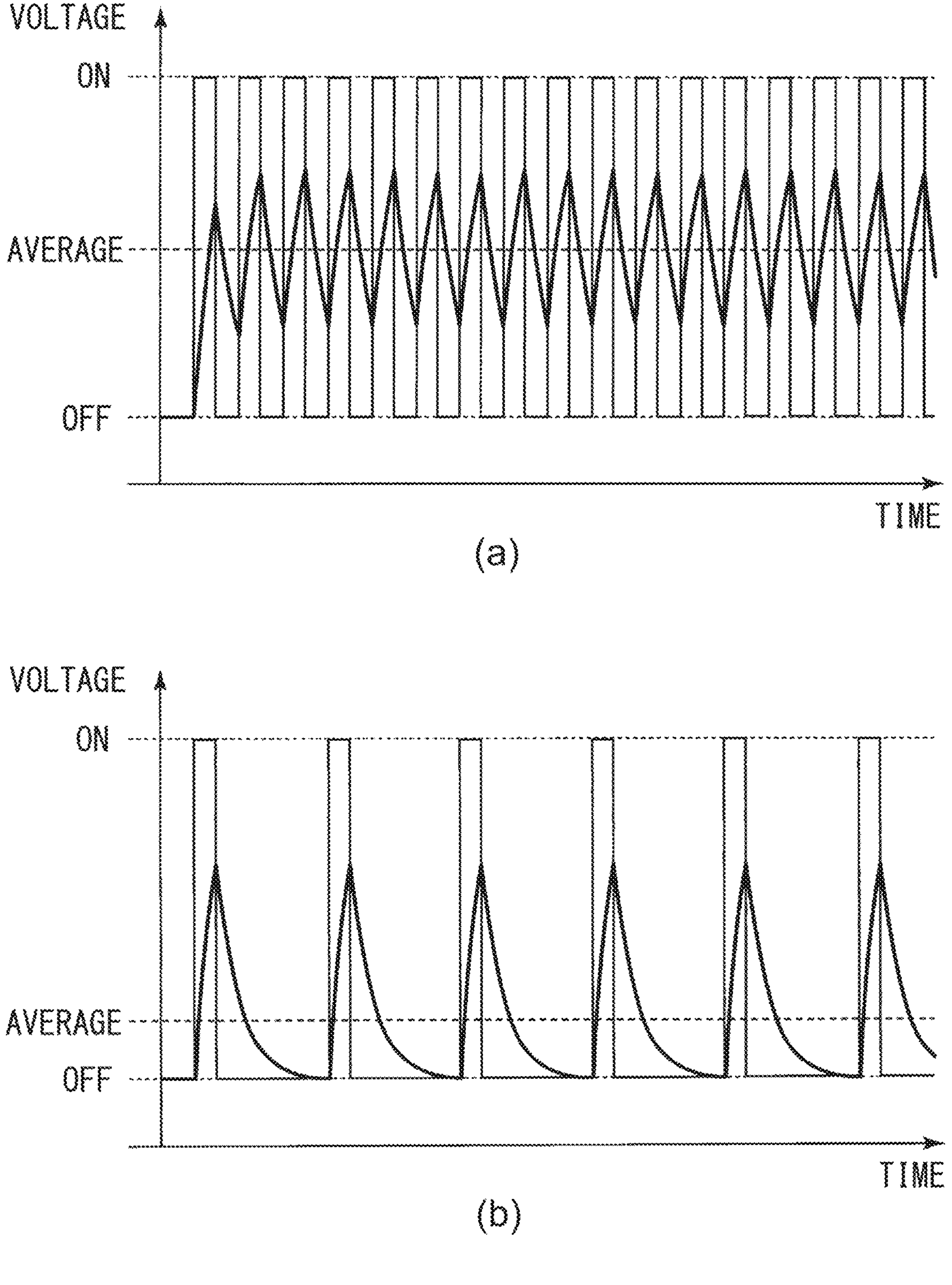

Parts (a) and (b) of FIG. 7 are graphs each for illustrating an example of a control method of a transfer bias.

DESCRIPTION OF THE EMBODIMENTS

In the following, an image forming apparatus according to the present invention will be described further specifically in accordance with the drawings. However, dimensions, materials, shapes, a relative arrangement, and the like of constituent elements described in the following embodiments should be appropriately changed depending on constitutions and various conditions of apparatuses to which the present invention is applied, and the scope of the present invention is not intended to be limited to the following embodiments.

Incidentally, for convenience, a magnitude (high/low) of a voltage or a potential (or a potential difference) refers to a magnitude (high/low) of the case where values thereof are compared with each other in terms of an absolute value unless otherwise specified.

1. Constitution of Image Forming Apparatus

Figure 1:
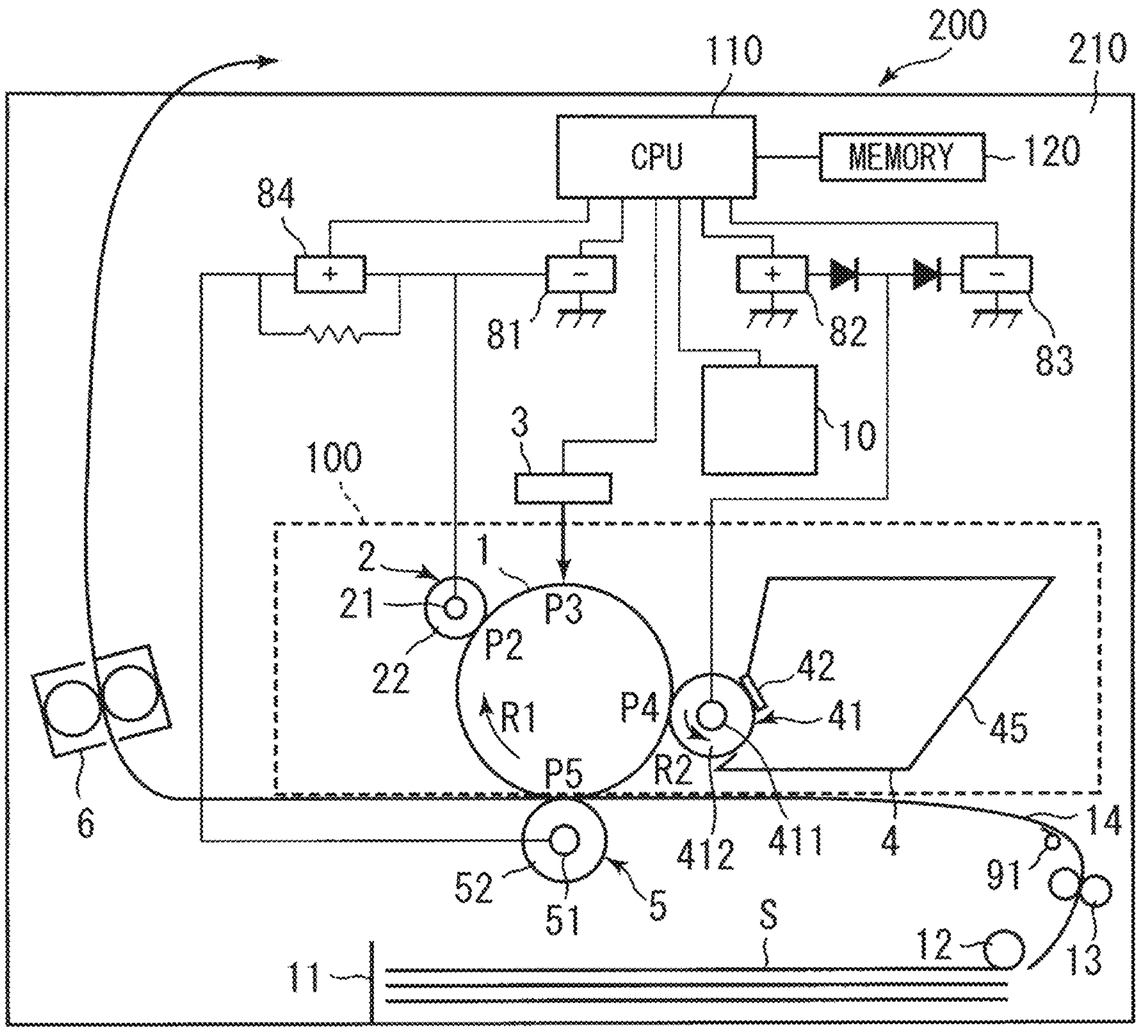
FIG. 1 is a schematic sectional view of an image forming apparatus of an embodiment 1.

First, using FIG. 1, a constitution of an image forming apparatus 200 of an embodiment will be described. FIG. 1 is a schematic sectional view of the image forming apparatus 200 of this embodiment.

The image forming apparatus 200 of this embodiment has a constitution in which a process cartridge 100 is detachably mountable to an apparatus main assembly 210 thereof. In this embodiment, the process cartridge 100 is constituted by integrally assembling a photosensitive drum 1 and, as a process means actable on the photosensitive drum 1, a charging roller 2 and a developing device (developing unit) 4 into a unit (cartridge). Here, the apparatus main assembly 210 is a portion obtained by excluding the process cartridge 100 from the image forming apparatus 200. The process cartridge executes a part of an image forming operation in a state in which the process cartridge 100 is mounted in the apparatus main assembly 210.

When the image forming operation is started, a rotatable drum-shaped (cylindrical) photosensitive member (electrophotographic photosensitive member) as an image bearing member is rotationally driven in an arrow R1 direction (clockwise direction) in FIG. 1 at a predetermined peripheral speed (process speed). The photosensitive drum 1 is rotated by a driving force transmitted from a driving motor (main motor) 10 as a driving source constituting a driving means.

A surface of a rotating photosensitive drum 1 is electrically charged uniformly to a predetermined polarity (negative polarity in this embodiment) and to a predetermined potential by the charging roller 2 which is a roller-type charging member as a charging means. The charging roller 2 includes an electroconductive charging roller core metal 21 and an electroconductive rubber layer (elastic layer) 22 formed at a periphery of the charging roller core metal 21. The charging roller 2 is provided in contact with the photosensitive drum 1 and is rotated about the charging roller core metal 21 with rotation of the photosensitive drum 1. To the charging roller core metal 21, a negative charging power source 81 as a charging bias applying means (charging bias applying portion) for applying a negative charging bias which is a DC voltage of a negative polarity (the same polarity as a charge polarity of the photosensitive drum 1) as a charging bias (charging voltage) is connected.

During image formation (during charging), to the charging roller 2, the negative charging bias is applied by the negative charging power source 81. A position, with respect to a rotational direction of the photosensitive drum 1, where the surface of the photosensitive drum 1 is charged by the charging roller 2 is a charging portion (charging position) P2. The charging roller 2 charges the surface of the photosensitive drum 1 by electric discharge generating in at least one of minute gaps formed between the photosensitive drum 1 and the charging roller 2 on sides upstream and downstream of a contact portion between the photosensitive drum 1 and the charging roller 2 with respect to the rotational direction of the photosensitive drum 1. However, for simplification, the contact portion between the photosensitive drum 1 and the charging roller 2 may be assumed and considered as the charging portion P2.

The charged surface of the photosensitive drum 1 is subjected to scanning exposure by an exposure device (laser scanner) 3 as an exposure means, so that an electrostatic latent image (electrostatic image) is formed on the photosensitive drum 1. The exposure device 3 includes a laser output portion and a rotatable polygonal mirror (polygon mirror) and forms the electrostatic latent image on the surface of the photosensitive drum 1 with a predetermined resolution by irradiating the surface of the photosensitive drum 1 with laser light depending on image information (image signal) as specifically described later. With respect to the rotational direction of the photosensitive drum 1, a position where the irradiation of the photosensitive drum 1 with the light by the exposure device 3 is carried out is an exposure portion (exposure position) P3.

The electrostatic latent image formed on the photosensitive drum 1 is developed (visualized) by being supplied with toner as a developer by the developing device 4 as a developing means, so that a toner image (toner picture, developer image) is formed on the photosensitive drum 1. In this embodiment, on an image portion of the photosensitive drum 1 lowered in potential by being exposed to light after being charged, the toner charged to the same polarity (negative polarity in this embodiment) as the charge polarity of the photosensitive drum 1 is deposited (reverse development type). In this embodiment, a normal charge polarity of the toner which is a principal charge polarity of the toner during development is the negative polarity. The developing device 4 includes a developing container 45 for accommodating the toner which is a non-magnetic one-component developer as the developer, a developing roller 41 as a developer carrying member (developing member), and a regulating blade 42 as a developer regulating member. To the surface of the toner, fine inorganic particles (external additive) are added, so that desired chargeability and flowability are imparted to the toner. The developing roller 41 includes an electroconductive developing roller core metal 411 and an electroconductive rubber layer (elastic layer) 412 formed at a periphery of the developing roller core metal 411. The developing roller 41 of the developing device 4 is pressed by a pressing spring which is an urging member as an urging means so that the developing roller 41 is contacted to the photosensitive drum 1 at a predetermined pressure. In this embodiment, the developing roller 41 always contacts the photosensitive drum 1 in a state in which the process cartridge 100 is mounted in the apparatus main assembly 210.

The developing roller 41 is rotationally driven about the developing roller core metal 411 in an arrow R2 direction (counterclockwise direction) in FIG. 1 at a predetermined peripheral speed. In this embodiment, the developing roller 41 is rotationally driven so that a peripheral speed ratio which is a ratio between the peripheral speed of the photosensitive drum 1 and the peripheral speed of the charging roller 2 becomes a predetermined peripheral speed ratio. Further, in this embodiment, the developing roller 41 is rotated by a driving force transmitted from the developing motor 10 common to the photosensitive drum 1 and the developing roller 41. A start and a stop of rotation of the developing roller 41 are made in synchronism with a start and a stop of rotation of the photosensitive drum 1, respectively.

To the developing roller core metal 411, a negative developing power source 83 as a developing bias applying means (developing bias applying portion) for applying a negative developing bias which is a DC voltage of a negative polarity (the same polarity as a charge polarity of the photosensitive drum 1) as a developing bias (developing voltage) is connected. During image formation (during development), to the developing roller 41, the negative developing bias is applied by the negative developing power source 83. By this developing bias, negatively chargeable toner is moved from the developing roller 41 to the photosensitive drum 1, so that the electrostatic latent image is visualized and thus the toner image is formed. Further, to the developing roller core metal 411, a positive developing power source 82 as a developing bias applying means (developing bias applying portion) for applying, to the developing roller 41, a positive developing bias which is a DC voltage of a positive polarity (opposite polarity to the charge polarity of the photosensitive drum 1) as a developing bias is also connected. Further, by appropriately selecting the positive developing bias and the negative developing bias, a predetermined developing bias is capable of being applied to the developing roller 41. Further, the regulating blade 42 is disposed in contact with the developing roller 41. The regulating blade 42 regulates an amount of the toner carried on the developing roller 41, and in addition, imparts a predetermined electric charge principally by triboelectric charge. A position (contact portion between the developing roller 41 and the photosensitive drum 1), with respect to the rotational direction, where the toner is supplied to the photosensitive drum 1 by the developing roller 41 is a developing portion (developing position) P4.

The toner image formed on the photosensitive drum 1 is transferred onto a recording material S as a toner image receiving member nipped and conveyed by the photosensitive drum 1 and a transfer roller 5, by the transfer roller 5 which is a roller-type transfer member as a transfer means. The transfer roller 5 includes an electroconductive transfer roller core metal 51 and a urethane foam layer (elastic layer) 52 formed at a periphery of the transfer roller core metal 51.

The transfer roller 5 contacts the photosensitive drum 1 in a state in which the recording material S is not interposed. In this embodiment, the image forming apparatus 200 is not provided with a mechanism for separating the transfer roller 5 from the photosensitive drum 1. To the transfer roller core metal 51, a positive transfer power source 84 as a transfer bias applying means (transfer bias applying portion) for applying, to the transfer roller 5, a positive transfer bias which is a DC voltage of the positive polarity (opposite polarity to the normal charge polarity) as a transfer bias (transfer voltage) is connected. During the image formation (during transfer), to the transfer roller 5 (transfer portion P5), a positive transfer bias is applied by the positive transfer power source 84. By this transfer bias, the toner image comprising the toner of the negative polarity on the photosensitive drum 1 is transferred onto the recording material S. The transfer roller core metal 51 is also connected to the above-described negative charging power source 81. Further, by adjusting each output of the negative charging power source 81 and the positive transfer power source 84, a predetermined transfer bias obtained by superposing these outputs can be applied. A position (contact portion between the transfer roller 5 and the photosensitive drum 1), with respect to the rotational direction of the photosensitive drum 1, where the toner image on the photosensitive drum 1 is transferred onto the recording material S by the transfer roller 5 is a transfer portion (transfer position) P5.

The recording materials (transfer material, recording medium, sheet) S are separated and fed one by one by a feeding roller 12 or the like as a feeding member from a cassette 11 as a photosensitive member accommodating portion, and then are conveyed to a registration roller pair 13 as a conveying member. Each recording material S is conveyed toward the transfer portion P5 so as to be timed to the toner image on the photosensitive drum 1 by the registration roller pair 13.

The recording material S on which the toner image is transferred is conveyed toward a fixing device (fixing voltage) 6 as a fixing means. The fixing device 6 fixes (melts, sticks) the toner image on the recording material S by pressing and heating the recording material S on which an unfixed toner image is carried. The recording material S on which the toner image is fixed is discharged (outputted) toward an outside of the apparatus main assembly 210.

Further, of the toner of the toner image formed on the photosensitive drum 1, a part of the toner (transfer residual toner) remaining on the photosensitive drum 1 without being transferred onto the recording material S is conveyed toward the charging portion P2 with rotation of the photosensitive drum 1. This transfer residual toner is negatively charged by electric discharge generating between the surface of the photosensitive drum 1 and the surface of the charging roller 2 on a side upstream of the contact portion between the photosensitive drum 1 and the charging roller 2 with respect to the rotational direction of the photosensitive drum 1 (herein, this electric discharge is referred to as "upstream electric discharge"). For that reason, by an electric field formed by a surface potential of the photosensitive drum 1 and the charging bias, on the transfer residual toner, an electrostatic force for moving the transfer residual toner from a charging roller 2 side toward a photosensitive drum 1 side acts. By this, the transfer residual toner passes through the charging portion P2 and is conveyed toward the developing portion P4 while being deposited on the surface of the photosensitive drum 1. At that time, the transfer residual toner deposited on a non-image portion on the surface of the photosensitive drum 1 which is not exposed to light at the exposure portion P3 is moved to the surface of the developing roller 41 by an electric field formed by a dark-portion potential of the surface of the photosensitive drum 1 and the developing bias. Then, the toner is accommodated in the developing container 45 with the rotation of the developing roller 41. Thus, in this embodiment, the transfer residual toner is collected by the developing device 4. On the other hand, the transfer residual toner deposited on the image portion of the surface of the photosensitive drum 1 exposed to light at the exposure portion P3 is conveyed as the toner image again toward the transfer portion P5 and is capable of being transferred onto the recording material S.

Thereafter, after a post-step (post-rotation step) (described later) is performed, the drive of the driving motor 10 is stopped, and the image forming operation is ended.

Incidentally, the image forming apparatus 200 is provided with various sensors. A registration sensor 91 as a recording material detecting means for detecting the recording material S is positioned in a conveying path 14 of the recording material S on a side upstream of the transfer portion P5 (and downstream of the registration roller pair 13), and detects whether or not the recording material S is present in the conveying path 14. A signal (information) indicating a detection result by the registration sensor 91 is sent to a CPU 110 (described later). By this, the CPU 110 discriminates a timing when each of a leading end and a trailing end of the recording material S with respect to a conveying direction of the recording material S reaches the transfer portion P5, and is capable of reflecting the timing into control of various biases or the like.

Further, the image forming apparatus 200 is provided with the CPU 110 as a controller. To the CPU 110, a memory (storing medium) 120 as a storing means provided in the image forming apparatus 200 is connected. The CPU 110 transfers various pieces of electrical information between itself and a host device (external device), and in addition, carries out integrated control in accordance with a predetermined control table or a predetermined reference table, in which operations such as the image forming operation (print job) of the image forming apparatus 200 are stored in the memory 120. For example, the CPU 110 controls output intensity, a change timing, and the like for various power sources, the exposure device 3, and the driving motor 10. The image forming apparatus 200 carries out the image formation on the basis of print information including an electric image signal inputted from the host device to the CPU 110. Incidentally, as the host device, it is possible to cite an image reader (original image reading device), a personal computer, a facsimile machine, a smartphone, and the like.

Here, the image forming operation (print job) is a series of operations for forming and outputting the image (images) on a single or a plurality of recording materials P and is started by a single starting instruction. The image forming operation includes in general an image forming step, a pre-step (pre-rotation step), a sheet interval step in the case where the images are formed on the plurality of recording materials P, and a post-step (post-rotation step). The image forming step (image forming process) is a period in which formation of the electrostatic latent image for the image formed and outputted on the recording material P, formation of the toner image, transfer of the toner image, and fixing are carried out in actuality, and during image formation refers to this period. Specifically, a timing during image formation is different at each of the positions where the respective steps of the charging, the exposure, the development, the transfer, and the fixing are carried out. The pre-step is a period from the input of the start instruction until the image is started to be formed in actuality, in which a preparation operation before the image forming step is performed. The sheet interval step is a period corresponding to an interval between a recording material S and a subsequent recording material S when the images are continuously formed on the plurality of recording materials S (continuous image formation). The post-step (post-rotation step) is a period in which a post-operation (preparatory operation) after the image forming step is performed. During non-image formation is a period other than during the image formation and includes the periods of the pre-step, the sheet interval step, the post-step, and in addition, during turning-on of a power source of the image forming apparatus 200, a pre-multi-rotation step which is a preparatory operation step during restoration from a sleep state, or the like.

Figure 2:
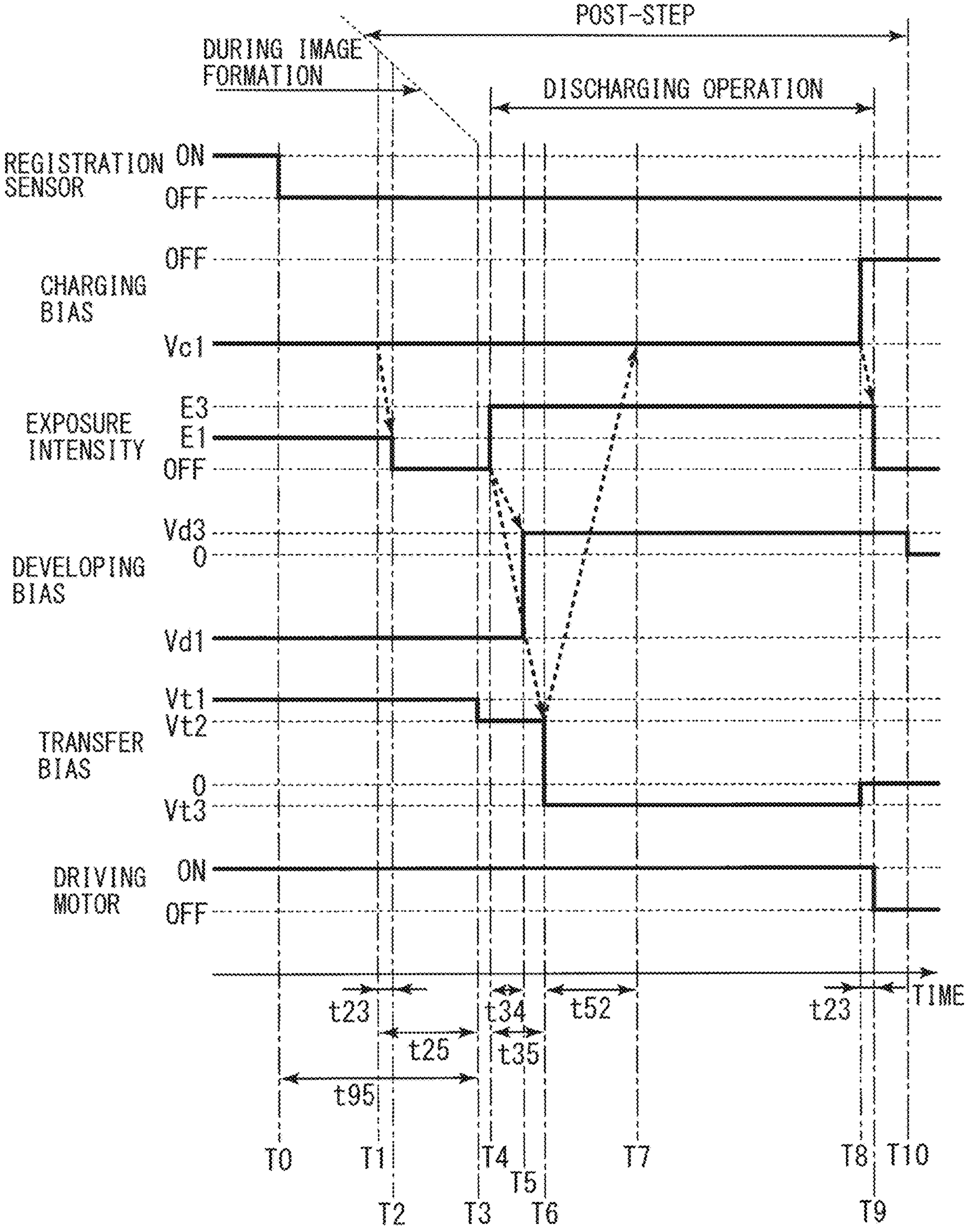
FIG. 2 is a timing chart for illustrating a post-step in the embodiment 1.

Next, using FIG. 2, the post-step after the image forming process in the image forming apparatus 200 of this embodiment will be described. FIG. 2 is a timing chart for illustrating control of an operation of the post-step in this embodiment. In FIG. 2, progression of ON/OFF of the registration sensor 91, ON/OFF of the driving motor 10, output of various biases (charging bias, developing bias, transfer bias), and exposure intensity of the exposure device 3 is shown. Further, in FIG. 2, the control in the post-step is shown continuously from control of the image forming process (during the image formation). An operation in accordance with the timing chart shown in FIG. 2 is controlled by the CPU 110.

Incidentally, the "image forming process (during the image formation)" in the control described using FIG. 2 refers to a process in which the toner image is formed on the surface of the photosensitive drum 1 and then is transferred onto the recording material S. Accordingly, in the control described using FIG. 2, even after the control of the charging bias or the like goes to the post-step after the image forming process, the fixing step by the fixing device 6 is performed in parallel. In FIG. 2, broken arrows represent that on the surface of the photosensitive drum 1, a portion positioned in a predetermined phase at a certain timing is moved to a designated phase of an associated one of the broken arrows with a lapse of time. Further, numerical values of the various biases and the like in this embodiment are examples, and are not limited to those values, and are set appropriately as described. Further, as described above, for convenience, a magnitude (high/low) of the voltage or the potential (or the potential difference) refers to the magnitude (high/low) in the case where values thereof are compared with each other in terms of an absolute value unless otherwise specified.

Further, in this embodiment, the image forming apparatus 200 has the development separation-less constitution, and as described above, the developing roller 41 and the photosensitive drum 1 are substantially always in contact with each other. Further, in this embodiment, in the image forming apparatus 200, when the rotation of the photosensitive drum 1 is started, the developing bias of the opposite polarity (opposite polarity to the normal charge polarity of the toner) during the image formation is applied to the developing roller 41. After the start of application of the developing bias to the developing roller 41 or substantially simultaneously with the developing bias application, the rotation of the photosensitive drum 1 and application of the charging bias to the charging roller 2 are started. Thereafter, in synchronism with a timing when the charged surface of the photosensitive drum 1 reaches the developing portion P4, the developing bias applied to the developing roller 41 is switched to the developing bias of the polarity (the same polarity as the normal charge polarity of the toner) during the image formation. By this, a degree of the fog during the startup can be alleviated. That is, in this embodiment, in a preparatory operation for starting the image forming apparatus 200 from a rest state, the rotation of the photosensitive drum 1 is started after or substantially simultaneously with a start of application of the developing bias, of the opposite polarity (opposite polarity to the normal charge polarity of the toner) to the polarity during the image formation, to the developing roller 41. For that reason, in this embodiment, as described using FIG. 2, the image forming apparatus 200 executes a discharging operation for electrically discharging the surface of the photosensitive drum 1 when the image forming operation is ended (when the image forming apparatus 200 is put in the rest state). By this, it is possible to set an appropriate developing bias during the startup without causing a large change in surface potential of the photosensitive drum 1 during the startup due to a difference in elapsed time from the last image forming operation, so that the fog during the startup can be suppressed. Here, the discharge (charge removal) of the surface of the photosensitive drum 1 is not limited to that the surface potential of the photosensitive drum 1 is made 0 V, but includes that at least a part of the electric charge of the surface of the photosensitive drum 1 is removed.

First, the control during the image formation will be described.

During the image formation, to the charging roller 2, a negative charging bias Vc1 is applied. Specifically, in this embodiment, the charging bias Vc1 is −1100 V. By this, in this embodiment, the surface potential (dark-portion potential) VD of the non-image portion of the photosensitive drum 1 becomes −550 V. That is, in this embodiment, a discharge start voltage (absolute value) between the photosensitive drum 1 and the charging roller 2 is about 550 V.

Further, during the image formation, from the exposure device 3, the photosensitive drum 1 can be irradiated with the laser light with exposure intensity E1. Specifically, in this embodiment, the exposure intensity E1 is 0.25 $\mu J/cm^2$. By this, the surface potential (light-portion potential) VL of the image portion of the photosensitive drum 1 becomes −100 V. Incidentally, in FIG. 2, the exposure intensity during the image formation shows a state in which a portion, including a marginal portion, of the photosensitive drum 1 can be irradiated with the laser light at set exposure intensity on the basis of an image signal or the like. On the other hand, in FIG. 2, exposure intensity in the post-step (described later) shows that an entire area of set exposure width Le is exposed to light at the set exposure intensity.

Further, during the image formation, to the developing roller 41, a negative developing bias Vd1 is applied. Specifically, in this embodiment, the developing bias Vd1 is −400 V. By this, between the light-portion potential VL1 of the surface of the photosensitive drum 1 and the developing bias Vd1, a potential difference (=Vd1−VL1) (herein, also referred to as a "developing contrast") of −300 V is formed, so that the toner of the negative polarity is moved from the developing roller 41 to the image portion of the surface of the photosensitive drum 1 and is deposited on the image portion. On the other hand, between the dark-portion potential VD of the surface of the photosensitive drum 1 and the developing bias Vd1, a potential difference (=Vd1−VD) (herein, also referred to as a "back contrast") of 150 V is formed, so that by an electric repulsive force, movement of the negative toner to the non-image portion of the surface of the photosensitive drum 1 (i.e., fog) is suppressed. Further, by this back contrast, as described above, the transfer residual toner is collected by the developing roller 41. It is desirable that an appropriate back contrast is formed principally by taking a balance between this fog suppression and the toner collection into consideration.

Incidentally, at this time, a part of an external additive deposited on the surface of the toner is also moved to the surface of the photosensitive drum 1. At that time, in addition to the case where the external additive is moved by being carried by the toner moved as the toner image and the fog to the surface of the photosensitive drum 1, there is also a case where the external additive liberated from the toner is moved alone to the surface of the photosensitive drum 1. By this, a state in which the external additive in an amount of a certain degree is deposited on the surface of the photosensitive drum 1 is formed.

Further, during the image formation, to the transfer roller 5, a positive transfer bias Vt1 is applied. Specifically, in this embodiment, the transfer bias Vt1 is subjected to feed-back control (constant-current control) as required so that in a state in which the recording material S is positioned in the transfer portion P5, a predetermined current (constant current of 13 μA in this embodiment) flows through the transfer portion P5. By this, the toner image of the negative toner formed on the surface of the photosensitive drum 1 is transferred onto the photosensitive drum 1. Further, the transfer bias of the positive polarity is applied to the transfer roller 5, so that a surface potential Vpre of the photosensitive drum 1 after the photosensitive drum surface passes through the transfer portion P5 (herein, this surface potential is referred to as a "post-transfer potential").

Specifically, in this embodiment, the surface potential of a portion where the dark-portion potential VD was −550 V is changed to the post-transfer potential Vpre of −450 V. Incidentally, the photosensitive drum 1 is rotated at a predetermined rotational speed, so that the voltage of −450 V which is the post-transfer potential Vpre formed when the photosensitive drum surface has passed through the transfer portion P5 is maintained without being largely attenuated even immediately before the photosensitive drum surface reaches the charging portion P2. Herein, the surface potential of the photosensitive drum 1 immediately before the charging portion P2 (herein, this surface potential is also referred to as a "pre-charging potential") is represented also by "Vpre" which is the same as the post-transfer potential. For that reason, during the image formation, a potential difference (=Vc1−Vpre) between the charging bias Vc1 and the pre-charging potential Vpre which is the surface potential of the photosensitive drum 1 immediately before the charging portion P2 (herein, this potential difference is also referred to as a "charging contrast") becomes −650 V.

With an increasing charging contrast, a degree of upstream electric discharge from the charging roller 2 to the surface of the photosensitive drum 1 in the charging portion P2 becomes larger. By this, the toner and the external additive which remain on the surface of the photosensitive drum 1 are more negatively charged, so that by a repulsive force with the negative charging bias applied to the charging roller 2, deposition of the toner and the external additive, positioned on the photosensitive drum 1, onto the surface of the charging roller 2 is suppressed.

Next, the control of the post-step will be described.

A step on and after a timing when a position on the photosensitive drum 1 that has passed through the transfer portion P5 when a trailing end of the recording material S with respect to the conveying direction of the recording material S passes through the transfer portion P5, passes through each portion (charging portion P2, exposure portion P3, developing portion P4) will be described as the post-step. Transition from the image forming process to the post-step is successively performed, as shown by broken lines in FIG. 2, in the order of the charging bias, the exposure, the developing bias, and the transfer bias in consideration of a phase difference of each portion (charging portion P2, exposure portion P3, developing portion P4, transfer portion P5) in the rotational direction of the photosensitive drum 1.

In the case where during the image formation the recording material S is positioned in a position of the conveying path 14 where the registration sensor 91 is provided, the registration sensor 91 sends an ON signal to the CPU 110. Thereafter, the image forming process progresses, and in a timing TO when the trailing end of the recording material S with respect to the recording material conveying direction has passed through the position where the registration sensor 91 is provided in the conveying path 14, a signal sent to the CPU 110 by the registration sensor 91 changes from the ON signal to an OFF signal. In the case where subsequent print information is not inputted to the CPU 110 and conveyance of subsequent recording material S is not performed, with this change in signal of the registration sensor 91 as a trigger, the CPU 110 makes transition from the image forming process to the post-step. It takes a time 195 required for moving the recording material S from a separation position of the registration sensor 91 to the transfer portion P5 in the conveying path 14 (herein, this time is also referred to as a "registration-transfer interval time"). That is, it takes the registration-transfer interval time 195 from the timing TO when the registration sensor 91 detects the trailing end of the recording material S with respect to the conveying direction to a timing T3 when the trailing end of the recording material S with respect to the conveying direction reaches the transfer portion P5. Specifically, in this embodiment, the registration transfer interval time t95 is 300 msec.

On the other hand, it takes a time t25 required for moving the surface of the photosensitive drum 1 from the charging portion P2 to the transfer portion P5 with the rotation of the photosensitive drum 1 (herein, this time is also referred to as a "charging-transfer interval time"). Specifically, in this embodiment, the charging-transfer interval time t25 is 150 msec. On the basis of these timings, first, the charging bias goes to the post-step in a timing T1 earlier, by the charging-transfer interval time t25, than the timing T3 when the trailing end of the recording material S with respect to the conveying direction reaches the transfer portion P5.

However, in this embodiment, the charging bias is not changed from the charging bias Vc1 during the image formation even in the post-step, but was made a certain value.

Then, the exposure by the exposure device 3 goes to the post-step. It takes a time t23 required for moving the surface of the photosensitive drum 1 from the charging portion P2 to the exposure portion P3 (herein, this time is also referred to as a "charging-exposure interval time"). Specifically, in this embodiment, the charging-exposure interval time t23 is 20 msec. For that reason, the exposure by the exposure device 3 goes to the post-step in a timing T2 after a lapse of the charging-exposure interval timing t23 from the timing T1 when the charging bias goes to the post-step. At this time, irradiation of the photosensitive drum 1 with the laser light by the exposure device 3 is turned off.

Then, the developing bias goes to the post-step. However, in this embodiment, similarly as the charging bias, the developing bias is not changed from the developing bias Vd1 during the image formation even in the post-step, but was made a certain value.

Thereafter, the transfer bias goes to the post-step in the timing T3 when the trailing end of the recording material S in the conveying direction has passed through the transfer portion P5. At this time, the transfer bias is changed from the transfer bias Vt1 to a transfer bias Vt2. Specifically, in this embodiment, a value of a voltage at which a predetermined current (constant current of 13 μA in this embodiment) flows in a state in which the recording material S is absent in the transfer portion p5 is acquired in a pre-step before the image forming process. Application of a transfer bias Vr2 (constant-voltage control) is started so that the value of the voltage acquired in the pre-step becomes a constant voltage from the timing T3. At this time, the post-transfer potential Vpre, i.e., the pre-charging potential Vpre is −450 V.

Next, the post-step goes to the discharging operation (discharging step). As shown in FIG. 2, in a timing T4, by the exposure device 3, irradiation of the entire area of the exposure width Le (described later) with the laser light at exposure intensity E3 is started. By this, formation of a surface of the photosensitive drum 1 discharged by the exposure to light (herein, this surface is referred to as an "exposure surface") is started. By this, the surface potential of the photosensitive drum 1 in the entire area of the exposure width Le becomes a light-portion potential VL3. At this time, in order to minimize the surface potential of the photosensitive drum 1, it is desirable that the exposure intensity is set to as high a value as possible. During the image formation, depending on a magnitude of the developing contrast, a thickness and a height of the toner image formed on the photosensitive drum 1 in the developing portion P4 largely fluctuate. For that reason, the exposure intensity E1 during the image formation is controlled within a light quantity settable range of the exposure device 3 on the basis of a control table set in advance depending on, for example, a use history of the process cartridge 100, a detection result of a temperature and a humidity, and the like. It is desirable that the exposure intensity E3 in the discharging operation is set to a value higher than a value of the exposure intensity E1 during the image formation. Specifically, in this embodiment, the exposure intensity E1 during the image formation is 0.25 $\mu J/cm^2$, whereas the exposure intensity E3 in the discharging operation is 0.45 $\mu J/cm^2$. By this, the light-portion potential VL1 during the image formation is −100 V, whereas the light-portion potential (surface potential of the exposure surface) VL3 in the discharging operation is −50 V. Thus, in this embodiment, the light-portion potential (surface potential of the exposure surface) VL3 in the discharging operation is lower in absolute value than the light-portion potential Vl1 during the image formation.

Here, a timing T4 when the formation of the exposure surface of the photosensitive drum 1 is started in the post-step can be made an arbitrary timing when the timing T4 is after a final image forming region (region in which the toner image is capable of being formed) in the image forming operation that has passed through the exposure portion P3. However, this timing T4 may desirably be set in consideration of various tolerances and the like, which include, for example, variations in position of respective portions (charging portion P2, exposure portion P3, developing portion P4, transfer portion P5) in the rotational direction of the photosensitive drum 1, a delay of a high voltage, a detection error of the registration sensor 91, a signal transmitting speed, a signal processing speed, and the like. Specifically, in this embodiment, the timing T4 when the formation of the exposure surface of the photosensitive drum 1 is started is after 320 msec from the timing TO when the registration sensor 91 is turned off.

There is a need to change the developing bias to an appropriate value so that deposition of the toner onto the photosensitive drum 1 due to the formation of the exposure surface of the photosensitive drum 1 is suppressed. That is, there is the need to change the developing bias to the appropriate value so that unintentional development with the toner due to formation of the developing contrast is not made or so that a fog (fog of the toner of the opposite polarity to the normal charge polarity) due to an increase in contrast is not liable to occur. It takes a time t34 required for moving the surface of the photosensitive drum 1 from the exposure portion P3 to the developing portion P4 (herein, this time is also referred to as an "exposure-development interval time"). Specifically, in this embodiment, the exposure-development interval time t34 is 50 msec. For that reason, at a timing T5 after a lapse of the exposure-development interval time t34 from the timing T4 when the formation of the exposure surface of the photosensitive drum 1 is started, the developing bias is switched from the developing bias Vd1 to a developing bias Vd3. The developing bias Vd3 may desirably be set so as to form an appropriate back contrast relative to the light-portion potential VL3 of the exposure surface of the photosensitive drum 1. That is, the developing bias Vd3 is made a value of a positive polarity side relative to the light-portion potential VL3 of the exposure surface of the photosensitive drum 1 so that the toner of the negative polarity is not moved to the photosensitive drum 1. Specifically, in this embodiment, the power source for outputting the developing bias is switched from the negative developing power source 83 to the positive developing power source 82, so that the developing bias is switched to the developing bias Vd3 of +100 V. By this, relative to the light-portion potential VL3 of −50 V at the exposure surface of the photosensitive drum 1, the back contrast (=Vd3−VL3) of 150 V which is the same as the back contrast during the image formation is formed.

Next, relative to the exposure surface of the photosensitive drum 1, the transfer bias is changed to an appropriate value. It takes a time t35 required for moving the surface of the photosensitive drum 1 from the exposure portion P3 to the transfer portion P5 (herein, this time is also referred to as an "exposure-transfer interval time". Specifically, in this embodiment, the exposure-transfer interval time t35 is 130 msec. For that reason, at a timing T5 after a lapse of the exposure-transfer interval time t35 when the formation of the exposure surface of the photosensitive drum 1 is started, the transfer bias is switched from the transfer bias Vt2 to a transfer bias Vt3. Specifically, in this embodiment, the transfer bias is switched to the transfer bias Vt3 of −500 V. Incidentally, a set value of this transfer bias Vt3 will be further specifically described later.

It takes a time t52 required for moving the surface of the photosensitive drum 1 from the transfer portion P5 to the charging portion P2 (herein, the time is also referred to as a "transfer-charging interval time"). Specifically, in this embodiment, the transfer-charging interval time T52 is 140 msec. The surface of the photosensitive drum 1 positioned in the transfer portion P5 when the transfer bias is switched to the transfer bias Vt3 at the timing T6 reaches the charging portion P2 at a timing T7 when the transfer-charging interval time t52 has elapsed. At this time, by the charging bias Vc1 applied to the charging roller 2, the exposure surface of the photosensitive drum 1 is charged again. With this, as described later, the external additive deposited on the surface of the photosensitive drum 1 is suppressed from being deposited on the surface of the charging roller 2, so that contamination of the charging roller 2 is suppressed.

Discharge (formation of the exposure surface of the photosensitive drum 1) of the photosensitive drum 1 by the exposure to light may desirably be made for one full circumference of the photosensitive drum 1. That is, a period of a discharging operation in which the discharge of the photosensitive drum 1 is made by exposing the photosensitive drum 1 to light at the exposure intensity E3 may desirably be not less than a time in which the photosensitive drum 1 rotates one full circumference. Incidentally, although the discharging operation period is not limited thereto, as regards the discharging operation period in which the discharge of the photosensitive drum 1 is made by exposing the photosensitive drum 1 to light, not more than a time in which the photosensitive drum 1 rotates five full circumferences is sufficient, and typically, the discharging operation period is not more than a time in which the photosensitive drum 1 rotates three full circumferences. In this embodiment, for a time in which the photosensitive drum 1 rotates two full circumferences, specifically for a time of 580 msec, exposure of the photosensitive drum 1 to light at the exposure intensity E3 is made, and then at a timing T9, the driving motor 10 is also turned off. That is, the drive of the photosensitive drum 1 by the driving motor 10 is also turned off simultaneously with the exposure of the photosensitive drum 1 to light by the exposure device 3.

Further, at a timing T8 earlier than the timing T9 by the charging-exposure interval time t23, specifically by 20 msec, the charging bias is turned off. Until the surface of the photosensitive drum 1 exposed to light at the exposure portion P3 reaches the charging portion P2, the surface potential of the photosensitive drum 1 is the light-portion potential VL3. On the other hand, until the photosensitive drum surface reaches the exposure portion P3 after being charged again in the exposure portion P2, the surface potential of the photosensitive drum 1 is the dark-portion potential VD. In the case where if the charging bias is turned off simultaneously with turning-off of the exposure of the photosensitive drum to light and the drive of the photosensitive drum 1 in the timing T9, the image forming operation is ended in a state in which the surface potential of the photosensitive drum 1 in a period from the charging portion P2 to the exposure portion P3 is the dark portion potential VD without being removed. Thereafter, in the case where the image forming apparatus is restarted in a state in which the surface potential of the photosensitive drum 1 does not cause dark decay, there is a possibility that the surface potential of the photosensitive drum 1 becomes high in a part of a region of the photosensitive drum 1 with respect to the rotational direction of the photosensitive drum 1 and thus the fog during the start of the image forming apparatus is liable to occur. Accordingly, the charging bias may desirably be turned off before the timing T9 when the exposure of the photosensitive drum 1 to light and the drive of the photosensitive drum 1 are turned off.

Further, in the timing T8 when the charging bias is turned off, the transfer bias is also turned off. This is because as described above, in this embodiment, the output value of the transfer bias is controlled by superposing the output of the negative charging power source 81 and the output of the positive transfer power source 84. In the case where the image forming apparatus 200 is constituted by including an independent power source for applying the transfer bias to the transfer roller 5, for example, a constitution in which the transfer bias is also turned off simultaneously with turning-off of the exposure of the photosensitive drum 1 to light and the drive of the photosensitive drum 1 in the timing T9 may be employed.

Further, the developing bias is turned off in a timing T10 after a lapse of a predetermined time from the timing T9 when the drive of the photosensitive drum 1 is turned off, specifically a lapse of 50 msec. This is because even when the CPU 110 issues a signal for stopping the drive of the driving motor 10, the photosensitive drum 1 is idled in a predetermined distance without being completely stopped in drive immediately after the signal is issued, and thus the fog during the period is suppressed.

In parallel to the operation of the above-described post-step, the fixing step and the discharging step of the recording material S from the apparatus main assembly 210 are ended, so that the image forming operation is completed.

3. Transfer Bias of Post-Step

Next, the transfer bias Vt3 applied to the transfer roller 5 when the exposure surface of the photosensitive drum 1 passes through the transfer portion P5 in the discharging operation of the post-step (hereinafter, this transfer bias is also simply referred to as a "transfer bias Vt3 in the discharging operation") will be further described.

The transfer bias Vt3 in the discharging operation is as described in the following, set so that an absolute value of a potential difference (=Vt3−VL3) between the surface potential VL3 of the exposure surface of the photosensitive drum 1 and the transfer bias Bt3 becomes less than a discharge start voltage between the photosensitive drum 1 and the transfer roller 5.

By this, contamination of the charging roller 2 due to deposition of the external additive on the charging roller 2 is suppressed. Further, the transfer bias Vt3 may desirably be set so that an electric field for moving the toner, from the transfer roller 5 side toward the photosensitive drum 1 side, charged to the negative polarity which is the normal charge polarity of the toner acts on the transfer roller 5. By this, the contamination of the transfer roller 5 due to the deposition of the toner on the transfer roller 5 is suppressed.

TABLE 1

| TB*[1] Vt3 | PDFES*[2] | PTP*[3] | CC*[4] | CRC*[5] | TRC*[6] |
|---|---|---|---|---|---|
| 700 | 750 | 200 | −1300 | X | X |
| 600 | 650 | 100 | −1200 | X | X |
| 500 | 550 | 0 | −1100 | Δ | X |
| 400 | 450 | −50 | −1050 | ◎ | X |
| 300 | 350 | −50 | −1050 | ◎ | X |
| 0 | 50 | −50 | −1050 | ◎ | X |
| −300 | −250 | −50 | −1050 | ◎ | Δ |
| −400 | −350 | −50 | −1050 | ◎ | Δ |
| −500 | −450 | −100 | −1000 | ○ | ○ |
| −600 | −550 | −200 | −900 | Δ | ◎ |
| −700 | −650 | −300 | −800 | X | ◎ |
| −800 | −750 | −400 | −700 | X | ◎ |

*[1]"TB" is the transfer bias [V].
*[2]"PDFES" is the potential difference [V] from the exposure surface.
*[3]"PTP" is the post-transfer potential [V].
*[4]"CC" is the charging contrast [V].
*[5]"CRC" is the charging roller contamination.
*[6]"TRC" is the transfer roller contamination.

A table 1 shows a result of evaluation of each of a degree of the contamination of the charging roller 2 and a degree of the contamination of the transfer roller 5 in four stages (levels) in the case where the transfer bias Vt3 in the discharging operation is changed. The degree of the contamination of the charging roller 2 and the contamination of the transfer roller 5 were evaluated by carrying out formation of images on 1000 sheets in a one sheet-intermittent manner. The one sheet-intermittent manner refers to a manner such that an operation in which the image is formed on one recording material S and thereafter the image forming apparatus 200 is once stopped in drive, and then the image is formed on one (subsequent) recording material S is repeated. Incidentally, in this embodiment, the degrees of the contamination of the charging roller 2 and the contamination of the transfer roller 5 were evaluated without performing a cleaning operation capable of being appropriately performed in the image forming apparatus of the electrophotographic type. The cleaning operation is an operation different from the normal image forming operation and the post-step, and, for example, is an operation in which various members are cleaned by providing an additional time in the case where various parameters such as a traveling distance (surface movement distance) of the photosensitive drum 1 exceed thresholds or in the like case.

As described above, in the discharging operation in this embodiment, the surface potential of the exposure surface of the photosensitive drum 1 is −50 V. Further, in the discharging operation in this embodiment, the charging bias Vc1 when the exposure surface of the photosensitive drum 1 is charged again is −1100 V. In the table 1, the potential difference (=Vt3−VL3) between the surface potential VL3 of the exposure surface of the photosensitive drum 1 and the transfer bias Vt3 in the case where the transfer bias Vt3 is changed is shown. Further, in the table 1, the post-transfer potential Vpre in the case where each transfer bias Vt3 is applied is shown. As described above, the post-transfer Vpre and the pre-charging potential Vpre are not changed largely. For that reason, the charging contrast (=Vc1−Vpre) which is a potential difference between the pre-charging potential Vpre and the charging bias Vc1 becomes values shown in the table 1.

Further, the contamination of the charging roller 2 is contamination of the charging roller 2 by the external additive deposited on the surface of the charging roller 2, and was evaluated by the following criteria. "◎" shows a state of no problem, "x" shows a state in which the surface of the photosensitive drum 1 is not readily charged due to deposition of the external additive in a large amount on the surface of the charging roller 2 and thus the fog becomes liable to occur due to that the surface of the photosensitive drum 1 is not readily charged, and in addition, surface potential non-uniformity of the photosensitive drum 1 occurs due to deposition non-uniformity of the external additive and thus density non-uniformity occurs. "Δ" shows a state in which the degree of the state is slighter than the degree of the state for "x", but does not reach a practical level. "○" shows a state in which slight density non-uniformity occurs, but the level thereof enough to satisfy the practical level. That is, the degree of the contamination of the charging roller 2 may desirably be "◎" or "○".

Further, the contamination of the transfer roller 5 is contamination of the transfer roller 5 by the toner accumulated on the surface of the transfer roller 5, and was evaluated by the following criteria. "◎" shows a state of no problem, "x" shows a state in which toner is deposited on a back surface of the recording material S by the toner accumulated on the surface of the transfer roller 5 and thus contamination (back contamination) occurs. "Δ" shows a state in which the degree of the state is slighter than the degree of the state for "x", but does not reach a practical level. "○" shows a state in which the toner is accumulated in a small amount on the surface of the transfer bias 5, but is not deposited on the back surface of the recording material S, and thus there is no practical problem. That is, the degree of the contamination of the transfer roller 5 may desirably be "◎" or "○".

Incidentally, by performing the cleaning operation appropriately as described above, the levels of the above-described contamination of the charging roller 2 and the above-described contamination of the transfer roller 5 are capable of being improved. Particularly, an improving effect is easily obtained by the cleaning operation for the contamination of the transfer roller 5 on which the toner is deposited as compared to that for the contamination of the charging roller 2 on which the external additive is deposited. This is because the external additive is smaller in size than the toner and has an odd shape compared with that of the toner, which has a shape close to the true sphere, and therefore, there is a tendency that a depositing force of the external additive to the surface of the charging roller 2 becomes large. However, as described above, the cleaning operation is performed by being added to a normal operation in general, so that down time (period in which the image cannot be formed) occurs. Further, depending on an execution frequency of the cleaning operation, for example, there are concerns that abrasion of a surface layer (resin layer) of the photosensitive drum 1 is accelerated by an increase in rotation distance of the photosensitive drum 1 and that toner deterioration is accelerated by an increase in rotation distance of the developing roller 41. For that reason, particularly, it is desirable that the contamination of the charging roller 2 can be suppressed even when the cleaning operation is not performed. It is more preferable if the contamination of the transfer roller 5 can be suppressed without performing the cleaning operation.

As shown in the table 1, even when the transfer bias Vt3 is made excessively large to the positive side or the negative side, the contamination of the charging roller 2 is liable to occur.

When the transfer bias Vt3 is made large to the negative side, the post-transfer potential Vpre becomes large to the negative side by the influence of the transfer bias Vt3. This is for the following reasons. First, an electric charge is injected from the transfer roller 5 into the surface of the photosensitive drum 1. Further, in addition thereto, when an absolute value of the potential difference (=Vt3−VL3) between the surface potential VL3 of the exposure surface of the photosensitive drum 1 and the transfer bias Vt3 becomes a discharge start voltage or more (550 V or more in this embodiment), negative (−) electric discharge occurs from the transfer roller 5 to the surface of the photosensitive drum 1. Accordingly, particularly, the absolute value of the potential difference (=Vt3−VL3) between the transfer bias Vt3 and the surface potential VL3 of the exposure surface of the photosensitive drum 1 becomes the discharge start voltage or more on the negative side, so that the post-transfer potential Vpre becomes high on the negative side and thus the charging contrast becomes small. As described above, the charging contrast is made large, an electrostatic repulsive force such that the external additive which is deposited on the surface of the photosensitive drum 1 and which is principally charged to the negative polarity is not caused to be deposited on the surface of the charging roller 2 is caused to easily act on the external additive. Further, by making the charging contrast large, the external additive deposited on the surface of the photosensitive drum 1 is further easily charged to the negative polarity due to the upstream electric discharge of the charging portion P2. That is, conversely, when the charging contrast is made small, there is a tendency that the contamination of the charging roller 2 is liable to occur.

On the other hand, in the case where the transfer bias Vt3 is made large to the positive side, contrary to the case where the transfer bias Vt3 is made large to the negative side, positive (+) electric discharge occurs from the transfer roller to the surface of the photosensitive drum 1. By this electric discharge, the external additive deposited on the surface of the photosensitive drum 1 assumes a positive electric charge. For that reason, by the potential difference between the surface potential of the photosensitive drum 1 and the charging bias, the positive external additive is liable to be deposited on the surface of the charging roller 2. Accordingly, as shown in the table 1, when the transfer bias Vt3 is made large to the positive side, the contamination of the charging roller 2 is liable to occur.

Thus, in order to suppress the contamination of the charging roller 2, the transfer bias Vt3 in the discharging operation is set so that the absolute value of the state difference (=Vt3−VL3) between the surface potential VL3 of the exposure surface of the photosensitive drum 1 and the transfer bias Vt3 becomes less than the discharge start voltage.

Further, as shown in the table 1, the contamination of the transfer roller 5 becomes easy to be suppressed with an increasing transfer bias Vt3 on the negative side. In general, during the image formation, in order to transfer the toner, charged to the negative polarity which is the normal charge polarity of the toner, from the surface of the photosensitive drum 1 onto the recording material S, the transfer bias large on the positive side relative to the surface potential of the photosensitive drum 1 is applied to the transfer roller 5. Further, also, in a preparatory operation in a pre-stage in which the recording material S is conveyed to the transfer portion P5, it is general that the electric field of the above-described polarity is applied by the transfer bias.

Here, most of the toner moved as the fog to the surface of the photosensitive drum 1 by the electric field due to the back contrast (herein, this toner is also referred to as "fog toner") assumes the electric charge of the positive polarity which is the opposite polarity to the normal charge polarity of the toner. However, a part of the fog toner assumes the electric charge of the negative polarity, so that a state in which negatively charged toner and positively charged toner are present in mixture on the surface of the photosensitive drum 1 is formed. Of the fog toner, the positively charged toner is not moved to the transfer roller 5 by the electric field formed between the transfer roller 5 and the photosensitive drum 1 under application of the positive transfer bias to the transfer roller 5 as described above, and becomes liable to remain on the surface of the photosensitive drum 1. On the other hand, of the fog toner, the negatively charged toner is liable to be deposited on the transfer roller 5 in a state in which there is no recording material S in the transfer portion P5. For that reason, it is desirable that the transfer bias Vt3 in the discharging operation is set so that an electric field is formed for moving the toner, charged to the negative polarity, which is the normal charge polarity of the toner, from the transfer roller 5 to the photosensitive drum 1. By this, the toner deposited on the transfer roller 5 and charged to the negative polarity can be moved to the surface of the photosensitive drum 1 again. Accordingly, as shown in the table 1, the contamination of the transfer roller 5 becomes easier to be suppressed with a larger transfer bias Vt3 on the negative side.

Thus, the transfer bias Vt3 in the discharging operation is set so that in order to suppress the contamination of the charging roller 2, the absolute value of the potential difference (=Vt3−VL3) between the surface potential VL3 of the exposure surface of the photosensitive drum 1 and the transfer bias Vt3 becomes less than the discharge start voltage. Further, the transfer bias Vt3 in the discharging operation may desirably be set so that in order to suppress the contamination of the transfer roller 5, the toner charged to the normal charge polarity of the toner is moved from the transfer roller 5 side to the photosensitive drum 1 side.

Therefore, in this embodiment, in order to compatibly realize the suppression of the contamination of the charging roller 2 and the suppression of the contamination of the transfer roller 5, the transfer bias Vt3 in the discharging operation was set to −500 V.

However, the present invention is not limited to the setting in this embodiment, but for example, setting in which importance is placed on the suppression of the contamination of the charging roller 2 than on the suppression of the contamination of the transfer roller 5 may be made. As described above, the toner which is a main factor of the contamination of the transfer roller 5 is, compared with the external additive which is a main factor of the contamination of the charging roller 2, easily suppressed in accumulation thereof by performing the cleaning operation appropriately. For that reason, in the discharging operation, setting in which importance is placed on the suppression of the contamination of the charging roller 2 may be made, i.e., the transfer bias Vt3 may be set to a value of which absolute value is less than the discharge start voltage on the positive side. That is, from the viewpoint of suppression of the contamination of the charging roller 2, the transfer bias Vt3 in the discharging operation may be either one of a positive value, a negative value, and 0 V if the transfer bias Vt3 is a value less that the discharge start voltage.

Incidentally, in the case where 0 V is selected as the transfer bias Vt3 in the discharging operation, it is desirable that output of the transfer bias applying means is not turned off but 0 V is outputted by the transfer bias applying means under control by the CPU 110 (constant-voltage control with 0 V as a target voltage). As shown in FIG. 1, the transfer roller 5 contacts the photosensitive drum 1, so that even when the transfer bias is turned off, an unspecified current is capable of flowing through between the electric charge remaining on the transfer roller 5 and the surface potential of the photosensitive drum 1. Further, the image forming apparatus 200 is provided with various surface applying means and other many circuits. For that reason, even when the transfer bias applying means is turned off, by the influence of a residual electric charge or the like of another bias applying means, a capacitor, or the like, the unspecified current is capable of flowing through between the transfer roller 5 and the photosensitive drum 1. From this, even in the case where 0 V is selected as the transfer bias Vt3, it is desirable that the transfer bias is intentionally made 0 V and is outputted. For example, as shown in FIG. 1, in the case of a constitution in which the positive transfer power source 84 and the negative charging power source 81 are connected to the transfer roller core metal 51, biases applied from the negative charging power source 81 and the positive transfer power source 84 to the transfer roller 5 are made values which are the same in absolute value and which are different in polarity, so that the transfer bias of 0 V can be applied to the transfer roller 5.

4. Exposure Width

Next, the exposure width of the photosensitive drum 1 when the exposure surface of the photosensitive drum 1 is formed in the discharging operation in the post-step will be further described.

When the exposure surface of the photosensitive drum 1 is formed in the discharging operation in the post-step, in order to suppress the fog at end portions with respect to a rotational axis direction of the photosensitive drum 1, the exposure width of the photosensitive drum 1 may desirably be set in the following manner. That is, it is desirable that the photosensitive drum surface is exposed to light in a range broader than a width of a region, in which the toner is carried on the developing roller 41, with respect to the rotational axis direction of the photosensitive drum 1 (rotational axis direction of the developing roller 41) (herein, this width is also referred to as a "developing opening width").

Figure 3:
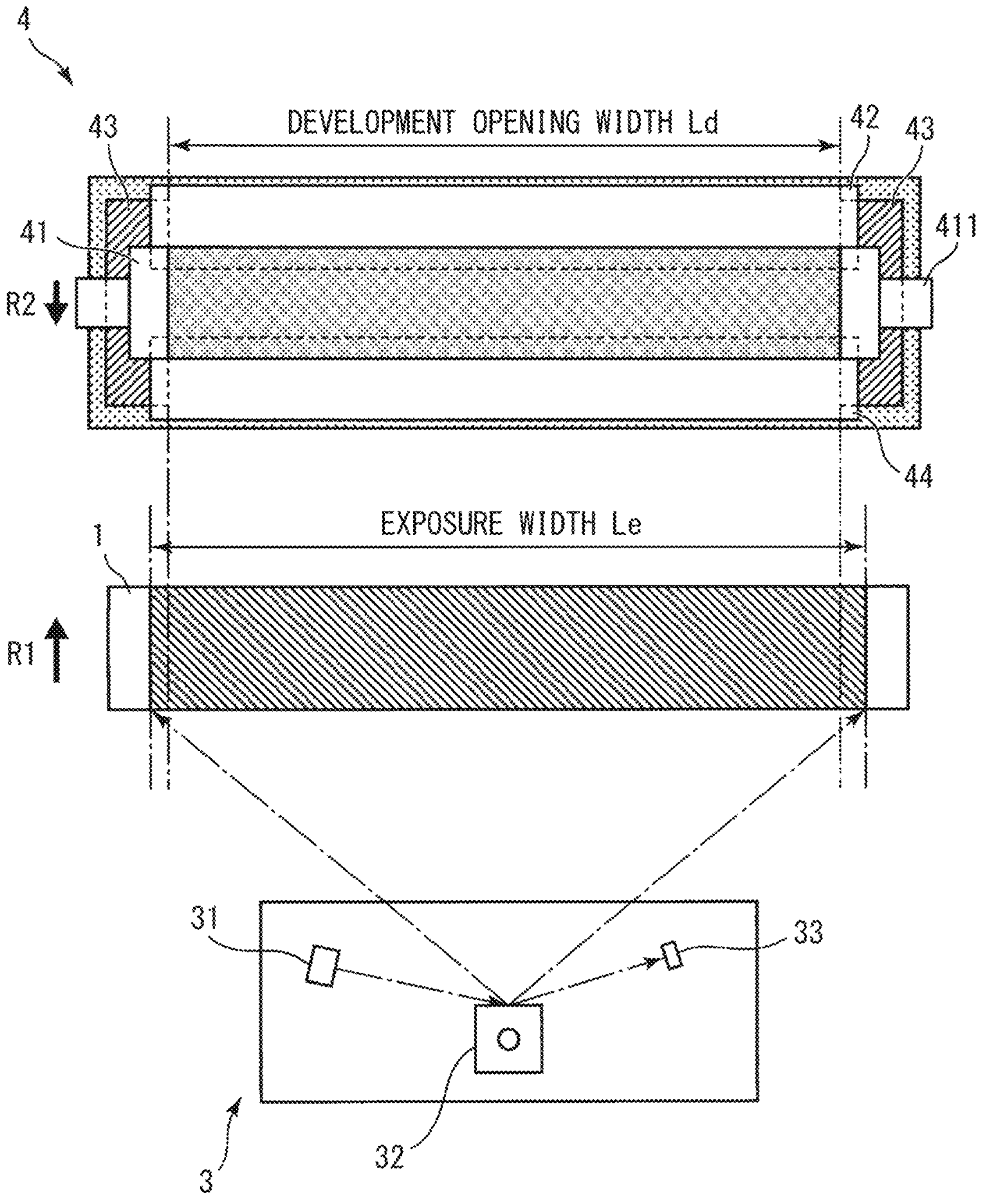
FIG. 3 is a schematic view for illustrating an exposure width in the embodiment 1.

FIG. 3 is a schematic view for illustrating a positional relationship between the developing device 4, the photosensitive drum 1, and the exposure device 3 with respect to the rotational axis direction of the photosensitive drum 1. The developing device 4 in FIG. 3 shows the positional relationship when the developing roller 41 is viewed from the photosensitive drum 1 side along a direction substantially perpendicular to the rotational axis direction of the photosensitive drum 1. Further, the photosensitive drum 1 in FIG. 3 shows the positional relationship when the photosensitive drum 1 is viewed from the developing roller 41 side along the direction substantially perpendicular to the rotational axis direction of the photosensitive drum 1.

The developing device 4 includes the developing roller 41. The developing roller 41 carries the toner, accommodated in the developing device 4, on the surface thereof. Further, the developing device 4 is provided with a plurality of sealing members so that the toner accommodated in the developing device 4 is not leaked to an outside of the developing device 4. With respect to a rotational direction R2 of the developing roller 41, on a side upstream of a portion where the photosensitive drum 1 and the developing roller 41 are in contact with each other, a regulating blade 42 is provided in contact with the developing roller 41. Further, with respect to the rotational direction R2 of the developing roller 41, on a side downstream of the portion where the photosensitive drum 1 and the developing roller 41 are in contact with each other, a sealing sheet 44 is provided in contact with the developing roller 41. By this, leakage of the toner from the sides upstream and downstream of the portion where the photosensitive drum 1 and the developing roller 41 are in contact with each other with respect to the rotational direction of the developing roller 41 is suppressed. Further, at opposite end portions of the developing roller 41 with respect to the rotational axis direction, two developing end portion sealing members 43 are provided in contact with the developing roller 41. By this, leakage-out of the toner from the end portions of the developing roller 41 with respect to the rotational axis direction through the surface of the developing roller 41 is prevented. For that reason, on the surface of the developing roller 41, the toner is carried in a portion between the two developing end portion sealing members 43, i.e., in a development opening width Ld shown in FIG. 3. Accordingly, to the surface of the photosensitive drum 1, the toner is capable of moving in a portion of the development opening width Ld. The development opening width Ld is set in general so as to be broader than an image forming region (region in which the toner image is formable depending on image information) to a certain degree with respect to the rotational axis direction of the photosensitive drum 1.

On the other hand, the exposure device 3 includes a laser output portion 31 and a polygon mirror 32. The laser light outputted from the laser output portion 31 is reflected by the rotating polygon mirror 32, and is corrected and polarized through unshown various lenses and mirrors. By this, the exposure device 3 exposes a region of the exposure width Le, of the surface of the photosensitive drum 1, to the laser light, with respect to the rotational axis direction of the photosensitive drum 1. Further, the exposure device 3 includes a BD sensor 33. The BD sensor 33 is disposed so as to receive the laser light reflected toward an outside of the exposure width Le by the polygon mirror 32 when the polygon mirror 32 becomes a predetermined phase. On the basis of a signal inputted, to the CPU 110, by the BD sensor 33 after the receiving the laser light, the CPU 110 discriminates whether or not a rotation cycle period of the polygon mirror 32 is stable.

As described above, the developing bias in the discharging operation is set to an appropriate value so that the developing bias provides an appropriate potential relationship with the surface potential of the exposure surface of the photosensitive drum 1. For that reason, a constitution in which with respect to the rotational axis direction of the photosensitive drum 1, the development opening width Ld in which the toner is capable of being supplied falls within the exposure width Le in the discharging operation may desirably be employed. By this, a relationship between the surface potential of the exposure surface of the photosensitive drum 1 and the developing bias becomes appropriate also in the end portions of the photosensitive drum 1 with respect to the rotational axis direction, so that it is possible to suppress the fog at the end portions of the photosensitive drum 1 with respect to the rotational axis direction.

Further, in this embodiment, as the exposure device 3, the laser scanner was used, but, for example, an LED array may also be used. Also, in that case, by disposing the LED array so that the development opening width Ld falls within the exposure width Le, it is possible to suppress the fog at the end portions of the photosensitive drum 1 with respect to the rotational axis direction in the discharging operation. However, in the case where the LED array is used as the exposure device, the LED is disposed at the end portions of the photosensitive drum 1 with respect to the rotational axis direction, which are not used for the image formation. For that reason, a length of the LED array becomes long, so that there is a possibility that the long LED array leads to increases in size and cost of the image forming apparatus. On the other hand, in the case where the loser laser scanner is used as the exposure device 3, a degree of freedom of the exposure width Le becomes large. This is because in the lower scanner, the entirety of a polarizable region by the polygon mirror 32 is not used for the image formation, and a constitution in which, for example, the BD sensor 33 is provided and in which the photosensitive drum surface is capable of being irradiated with the laser light toward the outside of the exposure width Le, is employed in many cases.

5. Control Method of Transfer Bias

In recent years, downsizing and cost reduction of the image forming apparatus 200 have advanced, and, for example, as a power source of the transfer bias, the following high-voltage constitution is used in some cases. That is, a constitution in which output itself during turning-on of a high-voltage is not made variable but the turning-on (ON) and turning-off (OFF) of the high voltage are finely repeated at a predetermined cyclic period and in which a macro output value is controlled by changing a ratio at an ON/OFF time is employed. In this constitution, it is preferable that an ON time is fixed and an OFF time is made a variable. By this, the output value of the transfer bias can be processed as a function with no extreme value, so that it becomes easy to derive the OFF time for applying a predetermined transfer bias.

Parts (a) and (b) of FIG. 7 are schematic views each showing a time change of the output value of the high-toner in the case where the macro output value of a bias is changed by changing the ratio of the ON/OFF time of the high voltage. Each of parts (a) and (b) of FIG. 7 shows the time change of the output value of the high voltage in the case where only a length of the time during the turning-off of the high voltage (i.e., OFF time) is changed. Specifically, part (a) of FIG. 7 shows the case where the OFF time is made the same time (1:1) as the ON time, and part (b) of FIG. 7 shows the case where the OFF time is made a length which is 5 times (1:5) the ON time. It is understood that by changing the OFF time, an average of the output indicated by a broken line is changed relative to the output value during the turning-on of the high voltage. At that time, the average of the outputted bias becomes lower with a longer OFF time, but on the other hand, ripples become worse. Further, the OFF time is counted by the CPU 110, but the number of counts reaches a ceiling at a certain value due to limitation of the CPU 110, so that the OFF time which is a predetermined time or more cannot be processed.

Thus, as shown in parts (a) and (b) of FIG. 7, only by changing the OFF time potential a certain ON time, there arises a limit in some instances in that the high voltage is made a predetermined output value during the image formation. In such a case, a plurality of values are set in advance as the ON time, and for example, a length of the ON time may be changed between during the image formation in which high output is required to some degree and in the discharging operation of the post-step. Here, it is general that the transfer bias outputted during the image formation is set to a value higher than the discharge start voltage. For that reason, the length of the ON time in the post-step may be set to a value shorter than the ON time during the image formation. Incidentally, in the case where the plurality of values are set as the ON time, in a memory 120 incorporated in the image forming apparatus 200, there is a need to prepare a reference table for control corresponding to each of the ON times. For that reason, the number of the values set as the ON time may desirably be a necessary minimum.

6. Modified Example

Next, a modified example of this embodiment will be described.

In this embodiment, as shown in FIG. 2, a switching timing of each of the biases was controlled on the basis of a phase of the photosensitive drum 1. In this case, the switching timing may be made earlier or later in consideration of various tolerances, a delay of the high voltage, and the like. For example, at the timing T5, the developing bias is switched from the negative developing bias Vd1 to the positive developing bias Vd3, but at that time, it takes a predetermined time due to the delay until the high-voltage output is stabilized to a value of the developing bias Vd3.

On the other hand, by starting formation of the exposure surface of the photosensitive drum 1 at the timing T4, the surface potential of the photosensitive drum 1 abruptly changes. For that reason, in a period from the switching of the developing bias at the timing T5 until the developing bias is actually stabilized to the developing bias Vd3, there is a possibility that a section in which the potential difference between the surface potential of the exposure surface of the photosensitive drum 1 and the developing bias is not appropriately formed. In the case where the change in developing bias is delayed by the delay and thus the developing bias becomes a negative-side value more than the surface potential of the photosensitive drum 1 by a predetermined value or more, the developing contrast is formed, so that there is a possibility that the toner carried on the developing roller 41 is moved to the photosensitive drum 1. For that reason, a timing when control is carried out so that the developing bias is switched to the developing bias Vd3 may be set earlier by a predetermined time than a timing when the exposure-development interval time t34 has elapsed from the timing T4 when the formation of the exposure surface of the photosensitive drum 1 is started. On the other hand, when the timing of the switching of the developing bias to the developing bias Vd3 is not excessively earlier, conversely, the back contrast becomes excessive, so that there is a possibility that the fog (fog of the toner of the opposite polarity to the normal charge polarity of the toner) becomes liable to occur.

Thus, particularly, it is desired that the developing bias switching timing is appropriately controlled so that the developing bias becomes an appropriate developing bias correspondingly to the exposure surface of the photosensitive drum 1. Therefore, in the discharging operation in the post-step, in order to more appropriately control the potential difference between the surface potential of the photosensitive drum 1 and the developing bias, the developing bias and the charging bias can be changed in a multistage manner.

Figure 4:
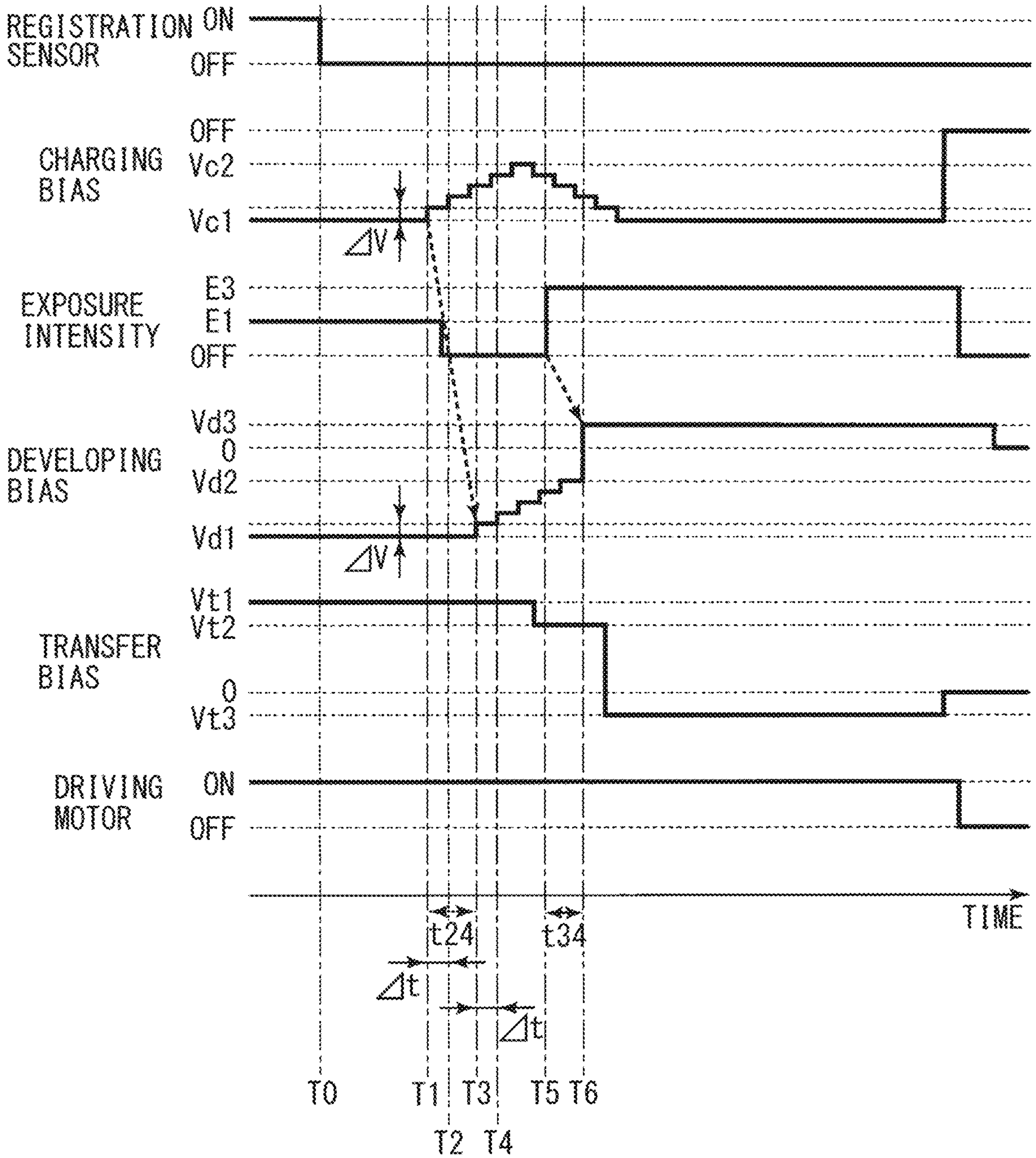
FIG. 4 is a timing chart for illustrating a post-step in a modified example of the embodiment 1.

FIG. 4 is a timing chart for illustrating control of operations in the post-step in the case where the developing bias and the charging bias are changed in the multistage manner. In FIG. 4, similarly as in FIG. 2, the control of the post-step is shown so as to be continued from the control of the image forming process (during the image formation). The operations in accordance with the timing chart shown in FIG. 4 are controlled by the CPU 110.

Also, in the case of FIG. 4, similarly as in the case of FIG. 2, when detection that the signal of the registration sensor 91 is turned off at the timing TO is made, transition to the post-step is started. Further, in the case of FIG. 4, at the timing T5, formation of the exposure surface of the photosensitive drum 1 is started by starting the exposure of the photosensitive drum 1 to light at the exposure intensity E3. Further, also, in the case of FIG. 4, similarly as in the case of FIG. 2, at a timing T6 when the exposure-development interval time t34 has elapsed from the timing T5 when the formation of the exposure surface of the photosensitive drum 1 is started, the developing bias is switched to the developing bias Vd3. By this, control is carried out so as to provide an appropriate potential relationship between the surface potential of the exposure surface of the photosensitive drum 1 and the developing bias Vd3.

Here, in the case of FIG. 4, the developing bias is not abruptly switched from the developing bias Vd1 to the developing bias Vd3, but from the timing T3, the developing bias is changed in a multistage (stepwise) manner. Further, correspondingly to this multistage contamination in developing bias, the charging bias is also changed in the multistage (stepwise) manner from the timing T1 earlier by the charging-development interval time t24 from the timing T3 when the multistage change in developing bias is started. That is, an operation such that each of the developing bias and the charging bias is changed by a bias difference ΔV, and then at a timing when a time difference Δt has elapsed, each bias is changed again by the bias difference ΔV is repeated. In this embodiment, the bias difference ΔV was 50 V, and the time difference Δt was 30 msec. Each of this bias difference ΔV and this time difference Δt can be set so as to keep the back contrast in a predetermined range so that the fog does not occur conspicuously. At that time, the bias difference ΔV and the time difference Δt may desirably be set in consideration of progression of actual high-voltage output, such as a delay, overshoot, and the like of the high voltage. Although these differences can be appropriately set depending on a characteristic of the power source or the like, but in order to keep the back contrast within the predetermined range, for example, it is suitable that the bias difference ΔV is about 30 V or more and 80 V or less, and the time difference Δt is about 10 msec or more and 50 msec or less.

By such control, the surface of the photosensitive drum 1 is discharged gently before being discharged abruptly at the timing T5, and with this, the developing bias can be changed gently. As a result, the potential difference between the surface potential of the photosensitive drum 1 and the developing bias is formed appropriately, so that the fog device at start of the discharging operation can be suppressed.

Further, as shown in FIG. 4, the charging bias was changed from the charging bias Vc1 to the charging bias Vc2 in the multistage manner, and then was returned to the charging bias Vc1 again. This is because, as described above, the contamination of the charging roller 2 is suppressed by increasing the charging contrast. At that time, when the charging bias Vc1 is made excessively high, the potential of the exposure surface of the photosensitive drum 1 also becomes high, so that there is a possibility that the surface of the photosensitive drum 1 cannot be sufficiently discharged. For that reason, in this embodiment, in view of a balance between the surface potential of the exposure surface of the photosensitive drum 1 and the charging contrast, the charging bias was set to the charging bias Vc1 which is the same as the charging bias during the image formation. Further, when the charging bias is returned from the charging bias Vc2 to the charging bias Vc1, in this embodiment, similarly as in the case where the charging bias is made low, the bias difference ΔV and the time difference Δt were changed in the multistage manner. This bias difference ΔV and this time difference Δt when the charging bias is made high are not needed to be the same as those when the charging bias is made low. Further, when the charging bias is made high, the charging bias may be made high at once to the charging bias Vc1. These charging biases may only be required to be set appropriately in view of breakdown voltage of high-voltage parts and overshoot of the output value and the like.

Further, the transfer bias and the charging bias set as described above are applied to at least a part of a region in a period in which the exposure surface passes through the transfer portion P5 and the charging portion P2, respectively, so that a corresponding effect can be obtained.

Further, in this embodiment, the charging bias in the discharging operation was made the same value as the charging bias during the image formation, but is not limited thereto. When the charging contrast as described above and the contamination of the charging roller 2 can be sufficiently suppressed, the charging bias in the discharging operation may be a value different from the charging bias during the image formation. In that case, when the contamination of the charging roller 2 can be sufficiently suppressed, the absolute value of the charging bias in the discharging operation may be higher or lower than the absolute value of the charging bias during the image formation.

7. Effect

In this embodiment, an image forming apparatus 200 includes a rotatable photosensitive member 1; a charging member 2 configured to form a charging portion P2 in contact with the photosensitive member and configured to electrically charge a surface of the photosensitive member 1 which rotates; a charging voltage applying portion (negative charging power source) 81 configured to apply a charging voltage to the charging member 2; an exposure device B configured to form an electrostatic latent image on the surface of the photosensitive member 1 by exposing, to light, the surface of the photosensitive member 1 charged by the charging member 2; a developing member (developing roller) 41 configured to form a developing portion P4 in contact with the photosensitive member 1 and configured to form a developer image on the surface of the photosensitive member 1 by supplying a developer, charged to a predetermined polarity, to the electrostatic latent image in the developing portion P4; developing voltage applying portions (positive developing power source, negative developing power source) 82 and 83 configured to apply a developing voltage to the developing member; a transfer member (transfer roller) 5 configured to form a transfer portion P5 in contact with the photosensitive member 1; transfer voltage applying portions (positive transfer power source, negative charging power source) 84 and 81 configured to apply a transfer voltage to the transfer portion P5; and a controller (CPU) 110 configured to control the charging voltage applying portion 81, the developing voltage applying portions 82 and 83, the transfer voltage applying portions 84 and 81, and the exposure device 3. Rotation of the photosensitive member 1 is stopped in a state in which the developing member 41 contacts the photosensitive member 1 after image formation in which the developer image is transferred from the photosensitive member 1 onto a developer image receiving member (recording material) S in the transfer portion P5. Further, in this embodiment, the controller 110 carries out control so as to execute a discharging operation for electrically discharging the surface of the photosensitive member 1 before the rotation of the photosensitive member 1 is stopped after the image formation, and in the discharging operation, an exposure surface is formed on the surface of the photosensitive member 1 by exposing the surface of the photosensitive member 1 to light by the exposure device 3, and the controller 110 carries out control so that: during passing of the exposure surface through the developing portion P4, to the developing member 41, the developing voltage on a side of the above-described predetermined polarity relative to a potential of the above-described exposure surface is applied, during passing of the above-described exposure surface through the transfer portion P5, to the transfer portion P5, the transfer voltage less than a discharge start voltage in absolute value of a potential difference between itself and the potential of the above-described exposure surface is applied, and during passing of the exposure surface through the charging portion P2, to the charging member 2, the charging voltage on the side of the above-described predetermined polarity relative to the potential of the above-described exposure surface is applied. In this embodiment, the image forming apparatus 200 is configured so that the rotation of the photosensitive member 1 is started in a state in which the developing member is contacted to the photosensitive member 1, and the controller 110 carries out control so that the developing voltage of the polarity opposite to the predetermined polarity is applied to the developing member 41 before a start of the rotation of the photosensitive member 1 or substantially simultaneously with the start of the rotation of the photosensitive member 1. Further, the controller 110 is capable of carrying out control so as to provide a period in which each of an absolute value of the charging voltage and an absolute value of the developing voltage is made low stepwise so that a potential difference between a surface potential of the photosensitive member and the developing voltage in the developing portion P4 when the developing voltage is changed from a developing voltage during the image formation to a developing voltage during the passing of the above-described exposure surface through the developing portion P4 in the above-described discharging operation is maintained in a predetermined range. In this case, the controller 110 is capable of carrying out control so that the absolute value of the charging voltage is made high after the absolute value of the charging voltage is made low in the above-described period and before the above-described exposure surface reaches the charging portion P2. Further, in this embodiment, the controller 110 provides a period in which the above-described exposure surface is formed by exposing the surface of the photosensitive member 1 to light by the exposure device 3 in a state in which the charging voltage is not applied to the charging member 2 before the rotation of the photosensitive member 1 is stopped, correspondingly to at least a time taken for movement of the surface of the photosensitive member 1 from the charging portion P2 to the exposure portion P3.

Further, in this embodiment, in the above-described discharging operation, the controller 110 carries out control so that during the passing of the above-described exposure surface through the charging portion P2, to the charging member 2, a charging voltage which is on the side of the predetermined polarity relative to the potential of the above-described exposure surface and which is not less than the discharge start voltage in absolute value of a potential difference between itself and the potential of the above-described exposure surface is applied. Further, in this embodiment, in the above-described discharging operation, the controller 110 carries out control so that during the passing of the above-described exposure surface through the transfer portion P4, to the transfer portion P5, a transfer voltage on the side of the predetermined polarity relative to the potential of the above-described exposure surface is applied. However, in the above-described discharging operation, the controller 110 may carry out control so that during the passing of the above-described exposure surface through the transfer portion P5, to the transfer portion P5, a transfer voltage on a side opposite to the predetermined polarity relative to the potential of the above-described exposure surface is applied. Further, preferably, in the above-described discharging operation, the controller 110 carries out control so that the above-described exposure surface is formed by exposing the photosensitive member 1 to light by the exposure device 3 in a time in which the photosensitive member 1 is rotated at least one full circumference. Further, in this embodiment in the above-described discharging operation, the controller 110 carries out control so that an absolute value of a potential difference between the potential of the above-described exposure surface and the charging voltage when the exposure surface reaches the charging portion P2 after passing through the transfer portion P5 is higher than an absolute value of a potential difference between a potential of a non-image portion on the photosensitive member and the charging voltage when the above-described exposure surface reaches the charging portion P2 after passing through the transfer portion P5 during the image formation. For that purpose, in this embodiment, in the above-described discharging operation, the controller 110 carries out control so that exposure intensity of the exposure device 3 is larger than exposure intensity of the exposure device 3 during the image formation. Further, in this embodiment, to the transfer portion P5, a superimposed voltage of an output of the charging voltage applying portion (negative charging power source) 81 and an output of the transfer voltage applying portion (positive transfer power source) 84 is applied. Further, in this embodiment, in the above-described discharging operation, the controller 110 carries out control so that to the charging member 2, a charging voltage with the same value as a value of a charging voltage during the image formation is applied. Further, in this embodiment, in the above-described discharging operation, the controller 110 carries out control so that the above-described exposure surface is formed by exposing the surface of the photosensitive member to light by the exposure device 3 in a region broader than a region in which the developer is supplied from the developing member 41 to the photosensitive member 1 in a rotational axis direction of the photosensitive member 1. Further, the controller 110 is configured to adjust an output value of the transfer voltage applying portion (positive transfer power source) 84 to the transfer portion P5 by controlling a ratio between an ON time which is a time in which the transfer voltage applying portion 84 outputs predetermined voltage and an OFF time which is a time in which an output of the transfer voltage applying portion 84 is stopped, and the controller 110 carries out control so that the above-described ON time during the passing of the above-described exposure surface through the transfer portion P5 in the discharging operation is made shorter than the above-described ON time during the image formation.

As described above, in this embodiment, in the discharging operation in the post-step, an appropriate transfer bias is applied to the exposure surface formed on the photosensitive drum 1, so that the exposure surface is charged again. Further, the charging contrast when the exposure surface is charged again in the discharging operation may desirably be set large, and in addition, to the exposure surface, the transfer bias less than the discharge start voltage may desirably be applied in the discharging operation. According to this embodiment, it is possible to suppress that the external additive or the like is deposited on the surface of the charging roller 2 in the post-step of the image forming operation. By this, it is possible to suppress an occurrence of an image defect resulting from improper charging such as a vertical stripe or the like due to deposition of the external additive or the like on the surface of the charging roller 2 in the post-step of the image forming operation.

Next, another embodiment (Embodiment 2) of the present invention will be described. Basic constitutions and operations of an image forming apparatus in this embodiment are the same as those of the image forming apparatus of the embodiment 1. Accordingly, in the image forming apparatus of this embodiment, elements having the same or corresponding functions or constitutions as those in the image forming apparatus of the embodiment 1 are represented by the same reference numerals or symbols as those in the image forming apparatus of the embodiment 1 and will be omitted from detailed description.

In the embodiment 1, the image forming apparatus 200 was configured to collect the transfer residual toner by the developing roller 41. On the other hand, in this embodiment, an image forming apparatus 300 is configured to collect the transfer residual toner by a cleaning device.

Figure 5:
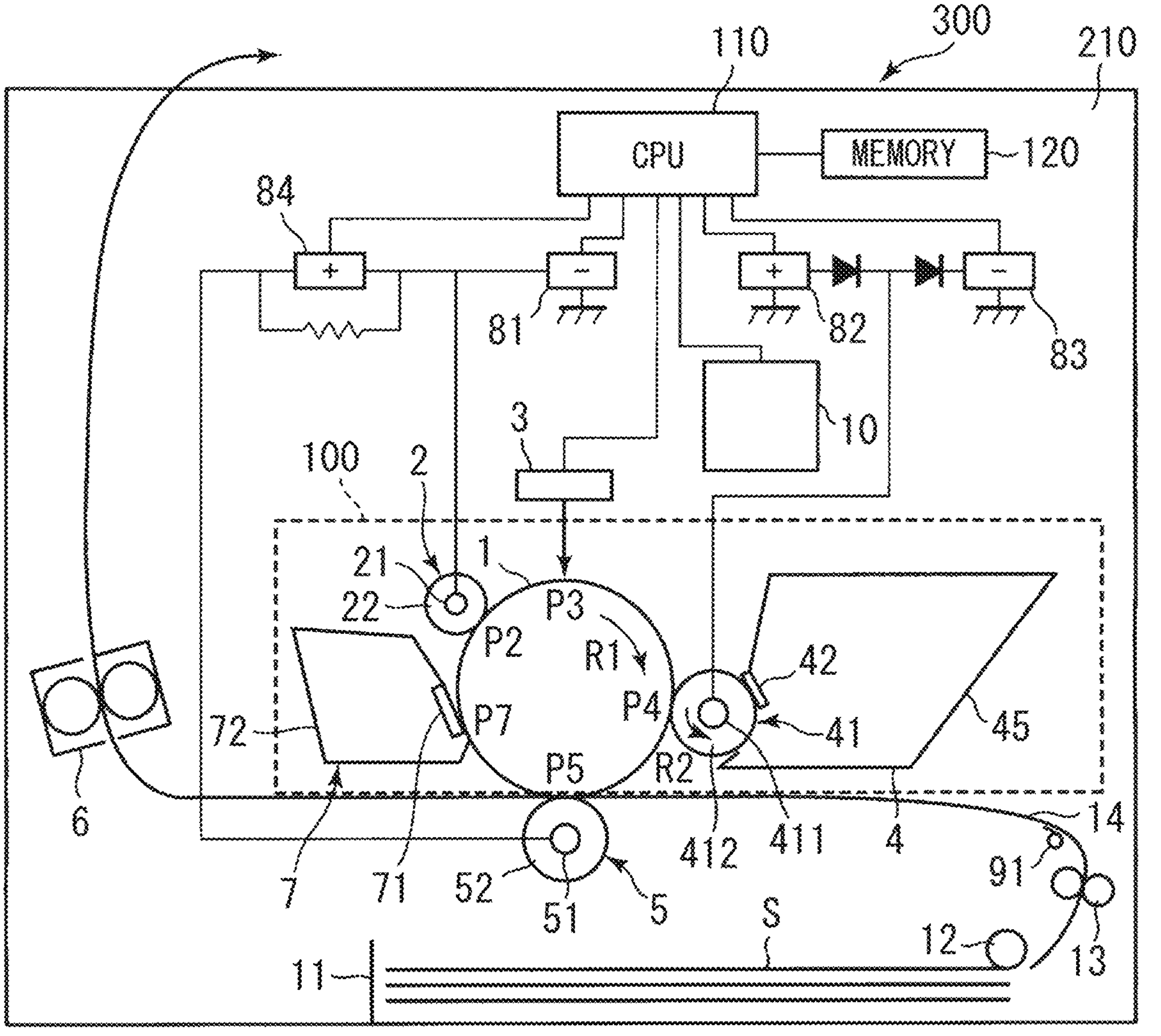
FIG. 5 is a schematic sectional view of an image forming apparatus of an embodiment 2.

FIG. 5 is a schematic view of the image forming apparatus 300 of this embodiment. In this embodiment, the image forming apparatus 300 includes a cleaning device (cleaning unit) 7 as a cleaning means. The cleaning device 7 cleans the surface of the photosensitive drum 1 in a cleaning portion P7 on a side downstream of the transfer portion P5 and upstream of the charging portion P2 with respect to the rotational direction of the photosensitive drum 1. The cleaning device 7 includes a cleaning container 72 and a flexible cleaning blade 71 as a cleaning member. The cleaning blade 71 is provided in contact with the surface of the photosensitive drum 1. A position where removal of the toner on the photosensitive drum 1 by the cleaning blade 71 with respect to the rotational direction of the photosensitive drum 1 is made (i.e., a contact portion between the cleaning blade 71 and the photosensitive drum 1) is the cleaning portion (cleaning position) P7. In this embodiment, a process cartridge 100 is constituted by integrally assembling the photosensitive drum 1, and as process means actable on the photosensitive drum 1, the charging roller 2, the developing device (developing unit) 4, and the cleaning device (charging unit) 7.

The cleaning device 7 scrapes off the toner and the external additive which are deposited on the surface of the photosensitive drum 1, and in addition, paper powder, a filler, and the like which are derived from the recording material S, by the cleaning blade 71 with rotation of the photosensitive drum 1. A part of the toner and the like which are scraped off by the cleaning blade 71 is accommodated in the cleaning container 72. Further, a part of the external additive relatively smaller in size than the toner stagnates in the cleaning portion P7 (contact portion between the cleaning blade 71 and the photosensitive drum 1), and acts as an inhibition layer for suppressing the toner and the external additive in a large amount from passing through the cleaning portion P7. On the other hand, the external additive in a slight amount passes through the cleaning portion P7, so that a lubricating property between the cleaning blade 71 and the photosensitive drum 1 is appropriately ensured.

Thus, also, in a constitution in which the cleaning device 7 is provided, the external additive is conveyed to the charging portion P2 in an amount to some extent. For that reason, also, in the constitution in which the cleaning device 7 is provided, the discharging operation in the post-step similar to the discharging operation in the post-step in the embodiment 1 may be executed. That is, a constitution in which in the post-step after the image formation, the exposure surface is formed and control is carried out so as to apply the charging voltage of the predetermined polarity which is the normal charge polarity of the toner relative to the potential of the exposure surface, to the charging roller 2 during passing of the exposure surface through the charging portion P2 (re-charging of the step surface) is employed. By this, the charging contrast which is the potential difference between the charging bias Vc applied to the charging roller 2 and the potential of the exposure surface (in this case, the post-transfer potential Vpre) becomes large, and thus deposition of the external additive on the surface of the charging roller 2 is suppressed, so that the contamination of the charging roller 2 can be suppressed.

However, by providing the cleaning device 7, compared with the case described in the embodiment 1, the amount of the external additive supplied to the charging roller 2 is decreased. For that reason, in the case where the above-described re-charging of the exposure surface is made, even when a setting range of the transfer bias applied to the transfer roller 5 in the discharging operation is made broader than the setting range in the case described in the embodiment 1, there is no practical problem for the contamination of the charging roller 2. However, it is not preferable that the transfer bias is set to a value higher on a negative side than the charging bias, i.e., set to a value higher on the negative side than −1100 V. In this case, there is a liability that the post-transfer potential Vpre becomes higher on the negative side than the dark-portion potential, specifically −550 V, due to the electric discharge in the transfer portion P5, and the charging contrast becomes smaller than the charging contrast in the case where the exposure surface is not formed, so that the degree of the contamination of the charging roller 2 is worsened. For that reason, in the constitution in which the cleaning device 7 is provided, as the transfer bias applied in the discharging operation in the post-step, a bias is applied further on the positive side relative to the charging bias.

Thus, in this embodiment, the image forming apparatus 300 includes the cleaning member 71, disposed in contact with the photosensitive member 1, for removing the developer from the photosensitive member 1, and rotation of the photosensitive member 1 is stopped in a state in which the developing member 41 contacts the photosensitive member 1 after image formation in which the developer image is transferred from the photosensitive member 1 onto the developer image receiving member S in the transfer portion P5. Then, in this embodiment, the controller 110 executes the discharging operation for discharging the surface of the photosensitive member 1 before the rotation of the photosensitive member 1 is stopped after the image formation. In the discharging operation, the exposure is formed on the surface of the photosensitive member 1 by exposing the surface of the photosensitive member 1 to light by the exposure device 3, and the developing voltage of the predetermined polarity which is the normal charge polarity of the developer relative to the potential of the exposure surface is applied to the developing member 41 during passing of the exposure surface through the developing portion P4. During passing of the exposure surface through the transfer portion P5, the transfer voltage is applied to the transfer portion P5, and during passing of the exposure surface through the charging portion P2, the charging voltage of the predetermined polarity relative to the potential of the exposure surface is applied to the charging member 2. The controller 110 carries out control so that the transfer voltage applied to the transfer portion P5 during the passing of the exposure surface through the transfer portion P5 is made on the opposite side (positive side relative to the charging voltage in this embodiment) to the above-described predetermined polarity relative to the charging voltage applied to the charging member 2 during the passing of the exposure surface through the charging portion P2.

Next, another embodiment (Embodiment 3) of the present invention will be described. Basic constitutions and operations of an image forming apparatus in this embodiment are the same as those of the image forming apparatus of the embodiment 2. Accordingly, in the image forming apparatus of this embodiment, elements having the same or corresponding functions or constitutions as those in the image forming apparatus of the embodiment 2 are represented by the same reference numerals or symbols as those in the image forming apparatus of the embodiment 2 and will be omitted from detailed description.

In the embodiment 2, the image forming apparatus 300 employed the constitution in which the developing roller 41 was always contacted to the photosensitive drum 1. On the other hand, in this embodiment, the image forming apparatus 300 employs a constitution in which the developing roller 41 is capable of being contacted to and separated from the photosensitive drum 1.

Figure 6:
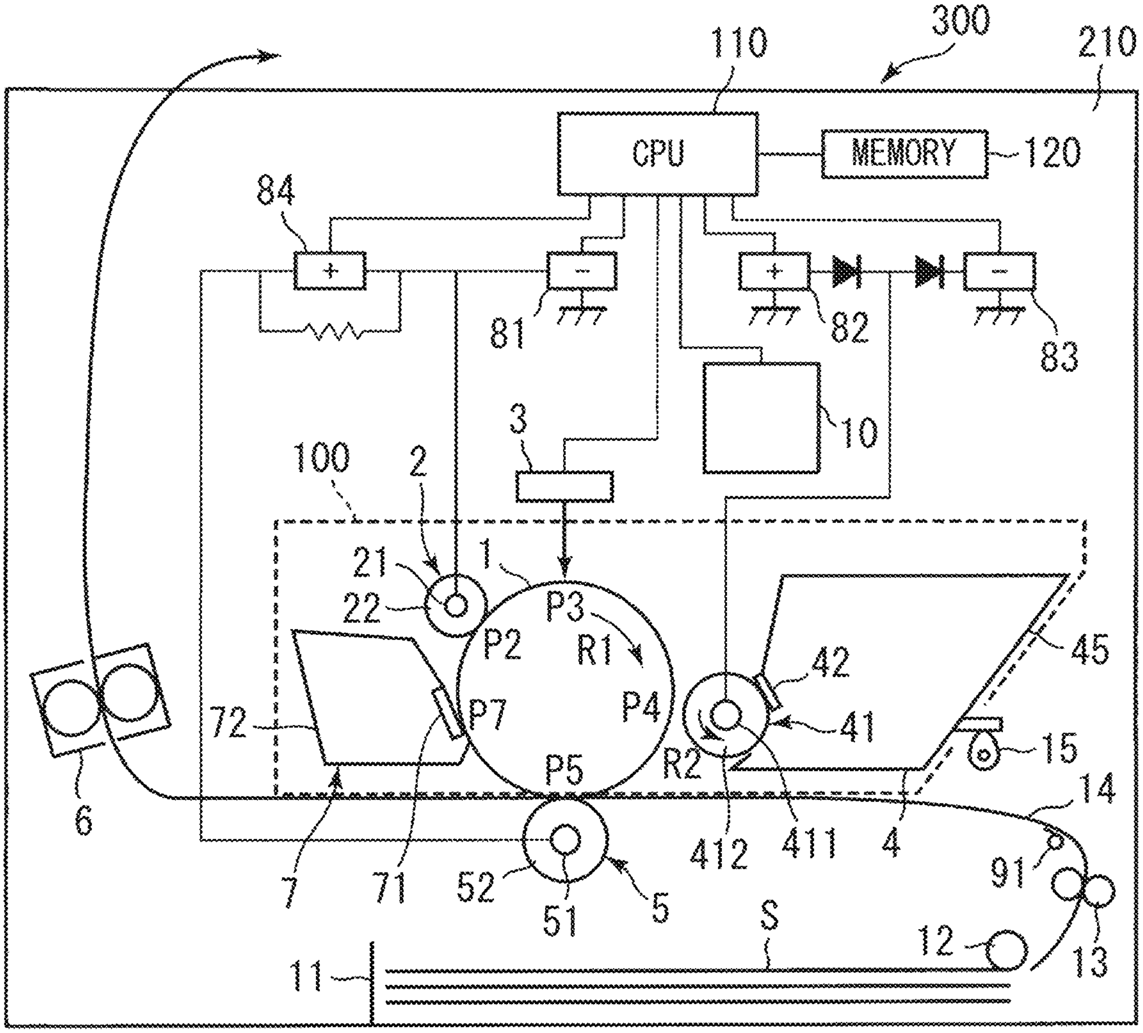
FIG. 6 is a schematic sectional view of an image forming apparatus of an embodiment 3.

FIG. 6 is a schematic view of the image forming apparatus 300 of this embodiment. In this embodiment, the image forming apparatus 300 includes a contact and separation mechanism 15. The contact and separation mechanism is controlled by the CPU 110 and is capable of bringing the developing roller 41 into contact with and separation from the photosensitive drum 1. In this embodiment, the process cartridge 100 is constituted by integrally assembling the photosensitive drum 1, and as the process means actable on the photosensitive drum 1, the charging roller 2, the developing device (developing unit) 4, and the cleaning device (cleaning unit) 7. For example, the developing device 4 is swingably connected to a drum unit provided with the photosensitive drum 1, the charging roller 2, and the cleaning device 7, and the developing roller 41 is urged in a direction of contacting the photosensitive drum 1 by a pressing spring which is an urging member as an urging means. Further, by a moving member such as a cam provided to the contact and separation mechanism 15, the developing device 4 is swung against an urging force of the above-described pressing spring, so that the developing roller 41 can be separated from the photosensitive drum 1. Further, movement of the developing device 4 by the urging force of the pressing spring is permitted by the contact and separation mechanism 15, whereby the developing roller 41 can be contacted to the photosensitive drum 1.

In such a constitution, the developing roller 41 is separated from the photosensitive drum 1 in the post-step after the image forming process, so that supply of the toner and the external additive from the developing roller 41 to the photosensitive drum 1 is not made. Further, when the rotation of the developing roller 41 is stopped while rotating the photosensitive drum 1 in a state in which the developing roller 41 contacts the photosensitive drum 1, there is a possibility that a surface of the developing roller 41 contacting the photosensitive drum 1 is damaged by sliding with the photosensitive drum 1. On the other hand, by separating the developing roller 41 from the photosensitive drum 1, an occurrence of the damage can be suppressed. Further, when the developing roller 41 is separated from the photosensitive drum 1, rotation of the developing roller 41 is stopped by a clutch mechanism (not shown), so that for example, the developing roller and the regulating blade 42 are caused to slide with each other, and thus deterioration of the toner can be suppressed.

However, even in a constitution in which the developing roller 41 is capable of being separated from the photosensitive drum 1, as described in the embodiment 2, the external additive in the slight amount passes through the cleaning portion P7. For that reason, even in the constitution in which the developing roller 41 is capable of being separated from the photosensitive drum 1, by executing the discharging operation in the post-step similar to the discharging operation in the post-step in the embodiment 1, deposition of the external additive on the surface of the charging roller 2 is suppressed, so that the contamination of the charging roller 2 can be suppressed.

In this embodiment, in the discharging operation, when the exposure surface passes through a position corresponding to the developing portion P4, the developing bias may only be required to be turned off by separating the developing roller 41 from the photosensitive drum 1. Further, in this embodiment, when the rotation of the photosensitive drum 1 is started, the developing bias is turned on at the time when the surface of the photosensitive drum 1 charged by the charging roller 2 reaches the position corresponding to the developing portion P4 and later, and then the developing roller 41 may only be required to be contacted to the photosensitive drum 1.

Thus, in this embodiment, the image forming apparatus 300 includes the contact and separation mechanism 15 for bringing the developing roller 41 into contact with and separation from the photosensitive member 1, and rotation of the photosensitive member 1 is stopped in a state in which the developing member 41 is separated from the photosensitive member 1 by the contact and separation mechanism 15 after the image formation in which the developer image is transferred from the photosensitive member 1 onto the developer image receiving member S in the transfer portion P5. Then, in this embodiment, the controller 110 executes the discharging operation for discharging the surface of the photosensitive member 1 before the rotation of the photosensitive member 1 is stopped after the image formation. In the discharging operation, the exposure is formed on the surface of the photosensitive member 1 by exposing the surface of the photosensitive member 1 to light by the exposure device 3. During passing of the exposure surface through the transfer portion P5, the transfer voltage is applied to the transfer portion P5, and during passing of the exposure surface through the charging portion P2, the charging voltage of the predetermined polarity relative to the potential of the exposure surface is applied to the charging member 2. The controller 110 carries out control so that the transfer voltage applied to the transfer portion P5 during the passing of the exposure surface through the transfer portion P5 is made on the opposite side (positive side relative to the charging voltage in this embodiment) to the above-described predetermined polarity, which is the normal charge polarity of the developer, relative to the charging voltage applied to the charging member 2 during the passing of the exposure surface through the charging portion P2.

As described above, the present invention was described based on the specific embodiments, but the present invention is not limited to the above-described embodiments.

In the above-described embodiments, to the image forming apparatus, the process cartridge is detachably mountable, but the present invention is also applicable to an image forming apparatus in which a process unit similar to the process unit constituting the process cartridge in the above-described embodiments is provided in the apparatus main assembly.

Further, in the above-described embodiments, the photosensitive drum, the charging roller, and the developing device (and further the cleaning device in the embodiments 2 and 3) are integrally assembled into the process cartridge.

On the other hand, for example, a drum unit prepared by integrally assembling the photosensitive drum and the charging roller (and further the cleaning device), and the developing device may also be made independently detachably mountable to the apparatus main assembly. Further, the supply container (toner supply unit) in which the developer (toner) supplied to the developing device is accommodated may also be made detachably mountable to the developing device. Further, in that case, the developing device is provided fixedly to the image forming apparatus, and only the supply container may be made detachably mountable to the apparatus main assembly.

Further, in the above-described embodiments, the monochromatic printer for forming the image with monochromatic toner was described, but a color printer for forming an image in the toner of a plurality of colors may also be used. For example, the present invention is applicable to a color image forming apparatus for forming a full-color image by transferring toner images of the plurality of colors by including a plurality of image forming portions (photosensitive drums and the like) and by using an intermediary transfer member such as an intermediary transfer belt. In that case, in each of the image forming portions, control in the post-step similar to the control in the post-step in the above-described embodiments may only be required to be carried out. Further, in the image forming apparatus having such a constitution, a transfer member for forming the transfer portion in contact with the photosensitive member is constituted by the intermediary transfer member and primary transfer members contacting the photosensitive member through the intermediary transfer member.

According to the present invention, it is possible to suppress the image defect due to the deposition of the external additive and the like on the charging member resulting from the post-step of the image forming operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-135939 filed on Aug. 23, 2023, which is hereby incorporated by reference herein in its entirety.

What is claimed is:

1. An image forming apparatus comprising:

a rotatable photosensitive member;

a charging member configured to form a charging portion in contact with the photosensitive member and configured to electrically charge a surface of the photosensitive member which rotates;

a charging voltage applying portion configured to apply a charging voltage to the charging member;

an exposure unit configured to form an electrostatic latent image on the surface of the photosensitive member by exposing, to light at an exposure portion, the surface of the photosensitive member charged by the charging member;

a developing member configured to form a developing portion in contact with the photosensitive member and configured to form a developer image on the surface of the photosensitive member by supplying a developer, charged to a predetermined polarity, to the electrostatic latent image in the developing portion;

a developing voltage applying portion configured to apply a developing voltage to the developing member;

a transfer member configured to form a transfer portion in contact with the photosensitive member;

a transfer voltage applying portion configured to apply a transfer voltage to the transfer portion; and a controller configured to control the charging voltage applying portion, the developing voltage applying portion, the transfer voltage applying portion, and the exposure unit, wherein, with respect to a rotational direction of the photosensitive member, the exposure portion is located downstream of the charging portion and upstream of the transfer portion, wherein rotation of the photosensitive member is stopped in a state in which the developing member contacts the photosensitive member after image formation in which the developer image is transferred from the photosensitive member onto a developer image receiving member in the transfer portion, wherein the controller carries out controls so as to execute a discharging operation for electrically discharging the surface of the photosensitive member before the rotation of the photosensitive member is stopped after the image formation, and wherein in the discharging operation, an exposure surface is formed on the surface of the photosensitive member by exposing the surface of the photosensitive member to light by the exposure unit, and the controller carries out controls so that:

during passing of the exposure surface through the developing portion, to the developing member, the developing voltage on a side of the predetermined polarity relative to a potential of the exposure surface is applied, during passing of the exposure surface through the transfer portion, to the transfer portion, the transfer voltage is applied such that an absolute value of a potential difference between the transfer voltage and the potential of the exposure surface is less than a discharge start voltage between the photosensitive member and the transfer member, and during passing of the exposure surface through the charging portion, to the charging member, the charging voltage on the side of the predetermined polarity relative to the potential of the exposure surface is applied.

2. The image forming apparatus according to claim 1, wherein the rotation of the photosensitive member is started in a state in which the developing member is contacted to the photosensitive member, and wherein the controller carries out control so that application of the developing voltage of the polarity opposite to the predetermined polarity to the developing member is started before a start of the rotation of the photosensitive member or substantially simultaneously with the start of the rotation of the photosensitive member.

3. The image forming apparatus according to claim 1, wherein the controller carries out control so as to provide a period in which each of an absolute value of the charging voltage and an absolute value of the developing voltage is made low stepwise so that a potential difference between a surface potential of the photosensitive member and the developing voltage in the developing portion, when the developing voltage is changed from a developing voltage during the image formation to a developing voltage during the passing of the exposure surface through the developing portion in the discharging operation, is maintained in a predetermined range.

4. The image forming apparatus according to claim 3, wherein the controller carries out control so that the absolute value of the charging voltage is made high after the absolute value of the charging voltage is made low in the period and before the exposure surface reaches the charging portion.

5. The image forming apparatus according to claim 1, wherein the controller carries out control so that a period, in which the exposure surface is formed by exposing the surface of the photosensitive member to light by the exposure unit in a state in which the charging voltage is not applied to the charging member after the discharging operation is ended and before the rotation of the photosensitive member is stopped, is provided correspondingly to at least a time taken for movement of the surface of the photosensitive member from the charging portion to the exposure portion.

6. The image forming apparatus according to claim 1, wherein in the discharging operation, the controller carries out control so that during the passing of the exposure surface through the charging portion, to the charging member, a charging voltage which is on the side of the predetermined polarity relative to the potential of the exposure surface and which is not less than the discharge start voltage in absolute value of a potential difference between itself and the potential of the exposure surface is applied.

7. The image forming apparatus according to claim 1, wherein in the discharging operation, the controller carries out control so that during the passing of the exposure surface through the transfer portion, to the transfer portion, a transfer voltage on the side of the predetermined polarity relative to the potential of the exposure surface is applied.

8. The image forming apparatus according to claim 1, wherein in the discharging operation, the controller carries out control so that during the passing of the exposure surface through the transfer portion, to the transfer portion, a transfer voltage on a side opposite to the predetermined polarity relative to the potential of the exposure surface is applied.

9. The image forming apparatus according to claim 1, wherein in the discharging operation, the controller carries out control so that the exposure surface is formed by exposing the photosensitive member to light by the exposure unit in a time in which the photosensitive member is rotated at least one full circumference.

10. The image forming apparatus according to claim 1, wherein in the discharging operation, the controller carries out control so that an absolute value of a potential difference between the potential of the exposure surface and the charging voltage when the exposure surface reaches the charging portion after passing through the transfer portion is higher than an absolute value of a potential difference between a potential of a non-image portion on the photosensitive member and the charging voltage when the exposure surface reaches the charging portion after passing through the transfer portion during the image formation.

11. The image forming apparatus according to claim 1, wherein in the discharging operation, the controller carries out control so that exposure intensity of the exposure unit is made larger than exposure intensity of the exposure unit during the image formation.

12. The image forming apparatus according to claim 1, wherein to the transfer portion, a superimposed voltage of an output of the charging voltage applying portion and an output of the transfer voltage applying portion is applied.

13. The image forming apparatus according to claim 1, wherein in the discharging operation, the controller carries out control so that to the charging member, a charging voltage with the same value as a value of a charging voltage during the image formation is applied.

14. The image forming apparatus according to claim 1, wherein in the discharging operation, the controller carries out control so that the exposure surface is formed by exposing the surface of the photosensitive member to light by the exposure unit in a region broader than a region in which the developer is capable of being supplied from the developing member to the photosensitive member in a rotational axis direction of the photosensitive member.

15. The image forming apparatus according to claim 1, wherein the controller is configured to adjust an output value of the transfer voltage applying portion to the transfer portion by controlling a ratio between an ON time which is a time in which the transfer voltage applying portion outputs a predetermined voltage and an OFF time which is a time in which an output of the transfer voltage applying portion is stopped, and the controller carries out control so that the ON time during the passing of the exposure surface through the transfer portion in the discharging operation is made shorter than the ON time during the image formation.

* * * * *